United States Patent
Goodwill et al.

(10) Patent No.: US 10,866,359 B2
(45) Date of Patent: Dec. 15, 2020

(54) APPARATUS AND METHODS FOR ACCOMMODATING MANUFACTURING VARIANCE IN OPTICAL PHOTONIC INTEGRATED CIRCUITS

(71) Applicants: Dominic John Goodwill, Ottawa (CA); Dritan Celo, Nepean (CA); Patrick Dumais, Ottawa (CA)

(72) Inventors: Dominic John Goodwill, Ottawa (CA); Dritan Celo, Nepean (CA); Patrick Dumais, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 33 days.

(21) Appl. No.: 15/883,418

(22) Filed: Jan. 30, 2018

(65) Prior Publication Data
US 2020/0064547 A1  Feb. 27, 2020

(51) Int. Cl.
*G02B 6/12* (2006.01)
*G02B 6/122* (2006.01)
*G02F 1/295* (2006.01)

(52) U.S. Cl.
CPC .......... *G02B 6/122* (2013.01); *G02B 6/12004* (2013.01); *G02F 1/2955* (2013.01); *G02B 2006/12135* (2013.01); *G02F 2203/24* (2013.01)

(58) Field of Classification Search
CPC ...... G02B 6/12; G02B 6/122; G02B 6/12004; G02B 2006/12135; G02F 1/2955; G02F 2203/24

(Continued)

(56) References Cited

U.S. PATENT DOCUMENTS

| | | |
|---|---|---|
| 2005/0063631 A1 | 3/2005 | Junnarkar |
| 2006/0120665 A1* | 6/2006 | Kato ............ B82Y 20/00 385/24 |

(Continued)

FOREIGN PATENT DOCUMENTS

| | | |
|---|---|---|
| CN | 104395797 A | 3/2015 |
| JP | 2005345729 A | 12/2005 |

OTHER PUBLICATIONS

Hiroaki Yamada, Kazumasa Takada, Member, IEEE, and Seiko Mitachi, "Crosstalk Reduction in a 10-GHz Spacing Arrayed-Waveguide Grating by Phase-Error Compensation", Journal of Lightwave Technology, 16 (3) 364-371, Mar. 1998.

(Continued)

*Primary Examiner* — Jerry M Blevins

(57) ABSTRACT

A photonic integrated circuit is provided that is adapted to compensate for an unintentional manufactured refractive index profile, such as a gradient, that arises due to manufacturing variance. The photonic integrated circuit including at least a thermal source and a spaced thermal sink to induce a thermal gradient in the photonic integrated circuit between the thermal source and the spaced thermal sink, the thermal gradient imparts an opposing thermal refractive index profile to correct for the manufactured refractive index profile. In some embodiments the photonic integrated circuit may be constructed with features that have an intentional structured refractive index profile that ensures any unintentional manufactured refractive index profile is correctable by the opposing thermal refractive index profile induced by the thermal source.

17 Claims, 16 Drawing Sheets

(58) Field of Classification Search
USPC .......................................................... 385/14
See application file for complete search history.

(56) References Cited

U.S. PATENT DOCUMENTS

| 2015/0076661 | A1 | 3/2015 | Musk et al. |
| 2016/0181495 | A1 | 6/2016 | Meade et al. |
| 2018/0013262 | A1 | 1/2018 | Caer et al. |
| 2018/0217472 | A1* | 8/2018 | Poulton ................. G02F 1/2955 |

OTHER PUBLICATIONS

Hooman Abediasl, Hossein Hashemi (U. Southern California) "Monolithic optical phased-array transceiver in a standard SOI CMOS Process", Opt.Express, 23 (5), pp. 6509—(2015).
Doylend, J.K., Heck, M.J.R., Bovington, J.T., Peters, J.D., Coldren, L.A. and Bowers, J.E., "Two-dimensional free-space beam steering with an optical phased array on silicon-on-insulator", Optics Express, vol. 19. No. 22, Oct. 24, 2011.
"SOI at the heart of the silicon photonics design", Arnaud Rigny (Soitec Inc.), Semicon Europa TechArena Conference, Oct. 2016.

* cited by examiner

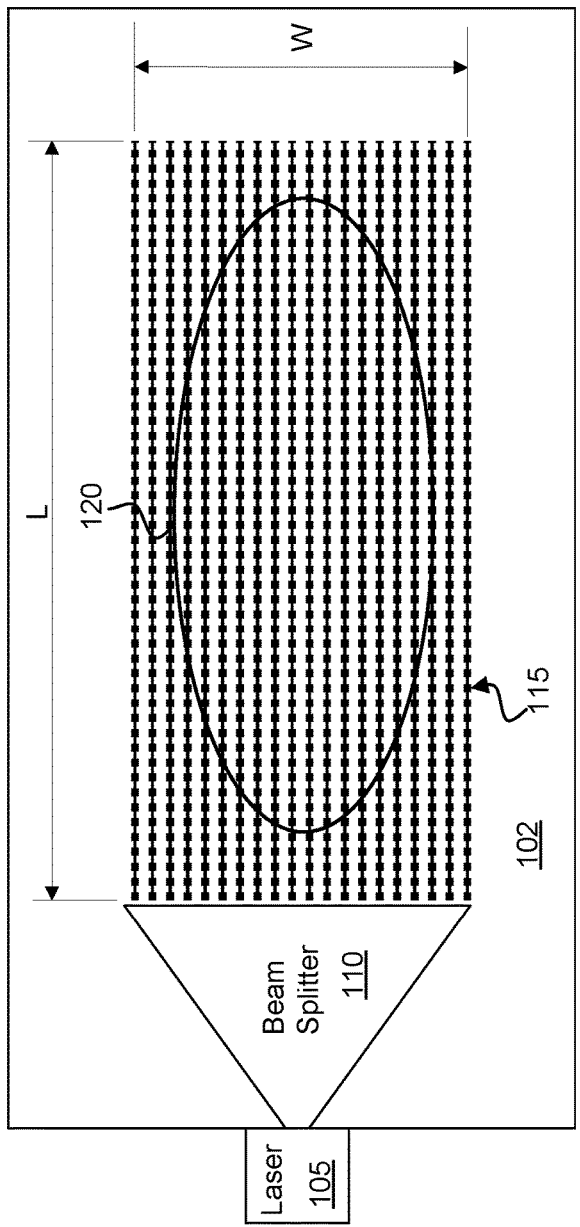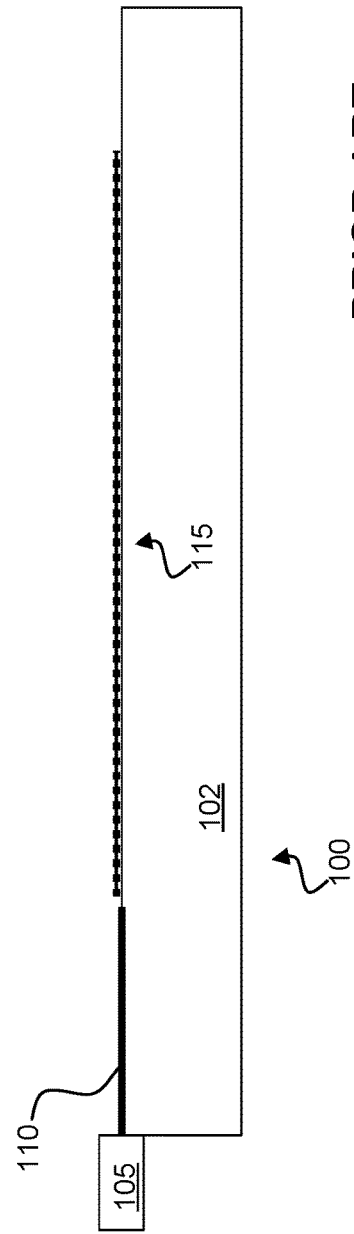
FIG. 1A PRIOR ART
FIG. 1B PRIOR ART

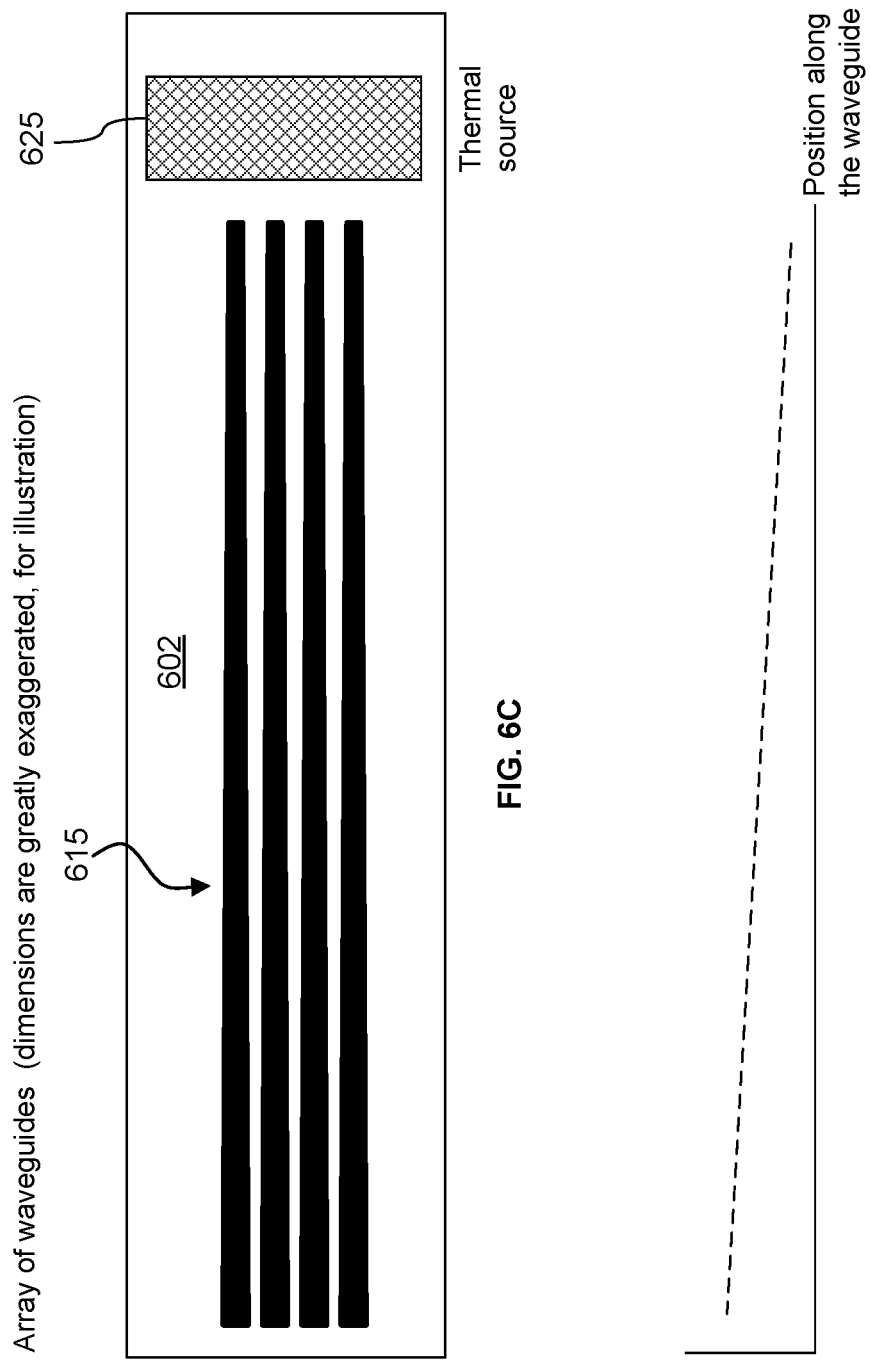

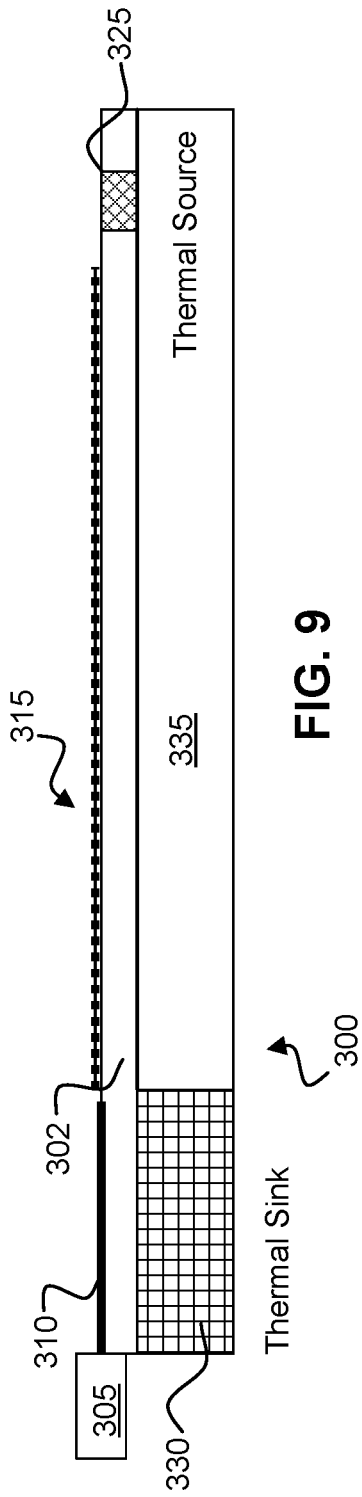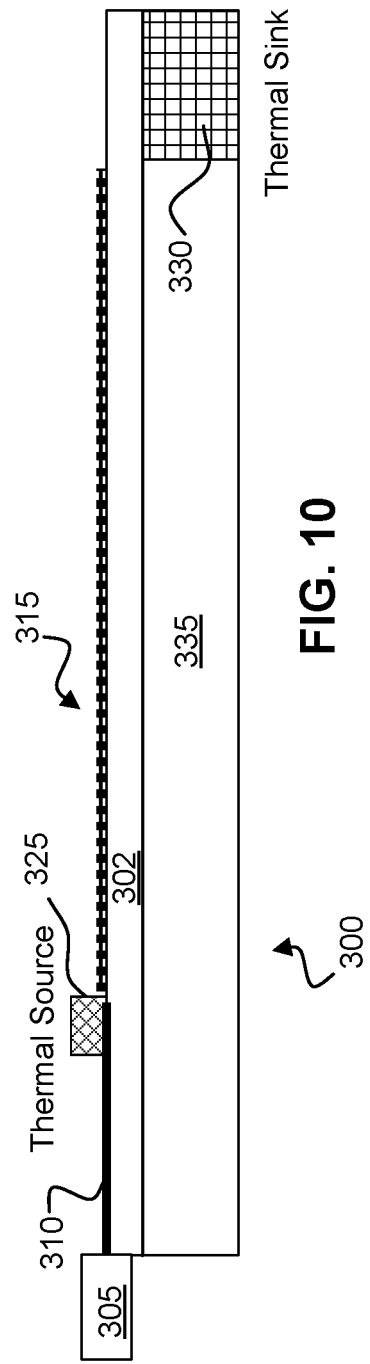

APPARATUS AND METHODS FOR ACCOMMODATING MANUFACTURING VARIANCE IN OPTICAL PHOTONIC INTEGRATED CIRCUITS

FIELD OF THE INVENTION

The present invention generally pertains to the field of integrated photonic integrated circuits, and particular embodiments or aspects relate to apparatus and methods for accommodating manufacturing variance in optical photonic integrated circuits.

BACKGROUND

Photonic integrated circuits allow for the integration of multiple optically active and passive functions on the same semiconductor chip. One area of research is to construct waveguide-based optical phased arrays as a photonic integrated circuit using standard semiconductor manufacturing processes. An optical phased array may transmit and/or receive an optical beam or plurality of optical beams, and may scan the angular orientation of such beam relative to the semiconductor chip.

Optical phased arrays are useful in a variety of industrial and consumer applications. A solid state phased array waveguide produced using semiconductor manufacturing techniques could provide highly functional devices at much lower cost than is presently the case. For instance, LiDAR (Light Detection and Ranging) devices have a wide range of uses from surveying to sensing for vehicle positional and trajectory control. As an example, autonomous land vehicles (e.g. cars and trucks) have been in development for some time, and many prototypes rely on LiDAR to supplement other sensors such as vision, radar, and ultrasonic.

While there are many useful applications for photonic optical circuits, including for instance LiDAR, a key problem to date has been the cost and manufacturing variance which may lead to inaccuracies.

One problem with solid state LiDAR is the sensitivity of the optical circuits, and in particular of the phased array waveguide of the LiDAR module, to manufacturing variation. For example, in order to produce a tight (narrow angular divergence) optical beam of sufficient beam quality necessary for accurate position measurement, it is necessary to build an optical phased array waveguide with a uniform emission/reception angle along the length of the waveguide. Current semiconductor manufacturing techniques can lead to variation in the index of refraction between different points on the semiconductor chip. This variation can lead to increased divergence of the emitted optical beam which can reduce the beam quality and accordingly reduce measurement accuracy. Similar problems may arise when using optical photonic chips in other applications.

Accordingly, it would be useful to have an optical chip structure and manufacturing technique that improves beam quality, reduces divergence, and/or exhibiting a tighter, narrow optical beam than is generally the case with current techniques. More broadly, it would be useful to have an optical chip structure and manufacturing technique that corrected for manufacturing variance.

Prior art optical phased array descriptions have focused on tuning the phase of input optical beams to an optical phased array. For instance, Doylend, J. K., Heck, M. J. R., Bovington, J. T., Peters, J. D., Coldren, L. A. and Bowers, J. E., "Two-dimensional free-space beam steering with an optical phased array on silicon-on-insulator", Optics Express, Vol. 19. No. 22, Oct. 24, 2011, pp. 21595 to 21604, discloses a phase-tuned optical phased array where thermo-optical phase tuning is achieved by locating resistive thermal sources adjacent to input waveguides in a phase-tuning region that feeds an optical phased array to correct for phase error of the input optical beams. While this arrangement allows for phase tuning of the input optical beams, it does not correct for manufacturing errors in the downstream optical phased array.

Accordingly, there may be a need for a system and method for a photonic integrated circuit, such as for instance an optical phased array, that is not subject to one or more limitations of the prior art.

This background information is intended to provide information that may be of possible relevance to the present invention. No admission is necessarily intended, nor should be construed, that any of the preceding information constitutes prior art against the present invention.

SUMMARY

In accordance with the present disclosure, an optical chip structure and manufacturing technique allows for adjustment or tuning during the manufacturing process, so that a plurality of optical modules could be built and adjusted to correct for manufacturing variance to provide the plurality of optical modules with consistent optical properties.

In some embodiments, a photonic integrated circuit is provided that is adapted to compensate for an unintentional refractive index profile, such as a refractive index gradient, that may arise due to manufacturing variance (i.e. a manufactured refractive index profile).

In an embodiment of a diffraction grating as the photonic integrated circuit, the unintentional manufactured refractive index profile imparts a divergence in an emission/reception angle of the diffraction grating from location to location along the diffraction grating leading to a lower resolution (poor quality) beam emitted/received by the diffraction grating.

In some embodiments, a photonic integrated circuit is provided that includes at least a thermal source and a spaced thermal sink. The thermal source and the thermal sink in thermal contact with a substrate of the photonic integrated circuit to induce a thermal profile in the form of a thermal gradient in the photonic integrated circuit between the thermal source and the spaced thermal sink. The thermal source and the thermal sink may be located around, for instance, at least one series of antennas that are part of the photonic integrated circuit. In some embodiments the thermal source comprises a heater that is operative to generate heat at the thermal source location. In some embodiments the thermal source may comprise a cooling element operative to cool the thermal source location.

In some embodiments, the at least one series of antennas comprise at least one series of receiving antennas. In some embodiments, the at least one series of antennas comprise at least one series of transmitting antennas.

The thermal profile (e.g. a thermal gradient) created when the thermal source is supplied with electrical power imparts an opposing thermal refractive index profile in the photonic integrated circuit between the thermal source and the thermal sink to correct for an unintentional manufactured refractive index profile created in the photonic integrated circuit due to unintentional manufacturing variance. As a result, an effective refractive index profile, a sum of the manufactured refractive index profile and the thermal refractive index profile, of the photonic integrated circuit is relatively uniform across the photonic integrated circuit when the thermal source is powered by a pre-determined level of electrical power.

In some embodiments the thermal refractive index profile comprises a linear thermal refractive index gradient between the thermal source and the thermal heat sink. In some embodiments a plurality of thermal sources and a separate one or more thermal heat sinks may be provided to provide a thermal refractive index profile that that is more varied than a linear gradient (i.e. a non-linear profile).

The thermal source may be implemented in some embodiments, for instance, as a resistive heater. The resistive heater may comprise, for instance, an electrically resistive material such as polysilicon or titanium nitride embedded in or on the photonic integrated circuit. Alternatively, the resistive heater may comprise, for instance, an electrically resistive material attached to the photonic integrated circuit, wherein said attachment may comprise a thermally conductive interface material or a mechanical clamp.

In some embodiments the photonic integrated circuit may be constructed such that at least one series of antennas is structured to have an intentional structured refractive index profile between the thermal source and the thermal sink when the thermal source is unpowered. For example, in some embodiments the structured refractive index profile may comprise a structured refractive index gradient between the thermal source and the thermal sink to ensure any unintentional manufactured refractive index gradient due to manufacturing variance is of opposite sign to the opposing thermal refractive index profile induced by the thermal source when activated. In the example of a series of antennas, for instance, the shape or size or size of the antennas along the series, the cross-section of the waveguide connecting the antennas, grating depth, or other optical feature, may vary to impart a structured refractive index profile along the series of antennas.

In some embodiments, a photonic integrated circuit is provided. The photonic integrated circuit including a substrate; at least one series of antennas extending across a coupling surface of the substrate; a thermal source in thermal contact with the substrate at a thermal source end of the series of antennas; and, a thermal sink in thermal contact with the substrate at an opposed thermal sink end of the at least one series of antennas. The thermal source may be located, for instance, on the coupling surface of the substrate, below the coupling surface or within the substrate.

In some implementations, the at least one series of antennas comprises a plurality of parallel waveguides operative to emit light out of the plane of a coupling surface of the substrate into the surrounding environment.

In some implementations, the photonic integrated circuit further includes an active beam steering component, for controlling the optical phase of light into at least one series of antennas, positioned at the opposed thermal sink end adjacent to the thermal sink. Positioning the active beam steering component adjacent to the thermal sink allows heat generated by the active beam steering component to flow to the thermal sink, rather than affecting the thermal gradient between the thermal source end and the opposed thermal sink end of the at least one series of antennas. Each antenna can be a grating period, or a tap to an antenna circuit as is known in the art.

In some implementations, the at least one series of antennas has an inherent structured refractive index profile that decreases from the opposed thermal sink end to the thermal source end. The structured refractive index profile is deliberately manufactured into the at least one series by varying the structure along the at least one series. The structure may be varied, for instance, by providing a decreasing cross-section of the waveguide of at least one series from the opposed thermal sink end to the thermal source end to create the decreasing refractive index. The magnitude of the structured refractive index profile may be larger than or comparable to the expected variation in refractive index profile due to manufacturing variation. Alternatively, the structure may be varied, for instance, by providing a varied pitch of the at least one series of antennas from the opposed thermal sink end to the thermal source end to create a structured variation of emission angle along the at least one series of antennas, which is larger than or comparable to the expected variation in emission angle due to the expected variation in refractive index profile that arise from manufacturing variation.

In some implementations, the photonic integrated circuit further comprises at least one other thermal source between the thermal source end and the opposed thermal sink end. For instance, the at least one other thermal source may extend along one side of the at least one series of antennas. In some cases, the at least one other thermal source may extend across the at least one series of antennas. The at least one other thermal source may be located on top of the substrate, below the substrate or within the substrate.

In some implementations, activating the thermal source imparts a thermal refractive index profile in the at least one series of antennas between the thermal source and the thermal sink. In some implementations at least one other thermal source is active to impart a non-linear refractive index profile in the at least one series of antennas.

In some implementations, the photonic integrated circuit further comprises an insulating layer across a bottom surface of the substrate, below the antennas on the coupling surface of the substrate, between the thermal sink and the thermal source.

In some embodiments, a method is provided for calibrating a photonic integrated circuit to compensate for an index of refraction gradient due to fabrication variance. The photonic integrated circuit may comprise at least one series of antennas extending across a coupling surface of the photonic integrated circuit, a thermal source at a thermal source end of the at least one series of antennas, and a thermal sink at an opposed thermal sink end of the at least one series of antennas. The method comprising: energizing the photonic integrated circuit to emit a beam of light out of the at least one series of antennas; measuring a beam quality of the emitted beam of light; incrementally increasing power to the thermal source and remeasuring the beam quality of the emitted beam of light; and, when the beam quality meets a pre-defined tolerance, locking the power to set a pre-determined power level of the thermal source to set a thermal gradient across and along the at least one series of antennas. In some implementations the beam quality is represented by the M-squared parameter of the optical beam.

In some embodiments, measuring the beam quality comprises measuring a divergence angle of the emitted beam of light; incrementally increasing power to the thermal source and remeasuring the divergence angle of the emitted beam of light; and, when the divergence angle meets a pre-defined tolerance angle, locking the power to set a pre-determined power level of the thermal source to set a thermal gradient across and along the at least one series of antennas.

In some implementations, the photonic integrated circuit further comprises at least one other thermal source between the thermal source end and the opposed thermal sink end, and the method further comprises: incrementally adjusting power to the at least one other thermal source and remeasuring the beam quality of the emitted beam of light; and, when the beam quality meets a pre-defined tolerance, locking the power to set at least one other power level of the corresponding at least one other thermal source to set the thermal profile along the at least one series of antennas. In some implementations the at least one other thermal source may extend along one side of the at least one series of antennas. In some implementations, the at least one thermal source further comprises at least two other thermal sources each extending along opposed edges of the at least one series of antennas between the thermal source end and the opposed thermal sink end, and the method further comprises: incrementally adjusting power to one of the at least two other thermal sources and then to the other of the at least two other thermal sources while remeasuring the beam quality of the emitted beam of light; and, when the beam quality meets a pre-defined tolerance angle, locking the power to set predetermined power levels of the at least two other thermal sources to set the thermal profile across and along the at least one series of antennas.

In some implementations, the photonic integrated circuit further comprises at least one other thermal source between the thermal source end and the opposed thermal sink end, and the method further comprises: incrementally adjusting power to the at least one other thermal source and remeasuring the divergence angle of the emitted beam of light; and, when the divergence angle meets a pre-defined tolerance angle, locking the power to set at least one other power level of the corresponding at least one other thermal source to set the thermal profile along the at least one series of antennas. In some implementations the at least one other thermal source may extend along one side of the at least one series of antennas. In some implementations, the at least one thermal source further comprises at least two other thermal sources each extending along opposed edges of the at least one series of antennas between the thermal source end and the opposed thermal sink end, and the method further comprises: incrementally adjusting power to one of the at least two other thermal sources and then to the other of the at least two other thermal sources while remeasuring the divergence angle of the emitted beam of light; and, when the divergence angle meets a pre-defined tolerance angle, locking the power to set pre-determined power levels of the at least two other thermal sources to set the thermal profile across and along the at least one series of antennas.

In some implementations, the at least one series of antennas comprises a plurality of parallel waveguides operative to emit light out of the plane of the photonic integrated circuit.

In some implementations, the photonic integrated circuit further comprises a thermal insulating layer under the at least one series of antennas between the thermal sink and the thermal source.

In some implementations, the at least one series of antennas has a structured refractive index profile that decreases from the opposed thermal sink end to the thermal source end. The structured refractive index profile may be created, for instance, by varying the structure of the at least one series of antennas along its length between the thermal source end and the opposed thermal sink end. The structured refractive index profile may be selected to ensure any unintentional refractive index profile arising from expected manufacturing variations will, when combined with the structured refractive index profile, result in a refractive index profile of opposite slope to the opposing refractive index gradient that results from the thermal gradient.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 1A is a top view of an example of a photonic integrated circuit;

FIG. 1B is a side view of the example of a photonic integrated circuit from FIG. 1A;

FIG. 6C is a top view of an embodiment of a photonic integrated circuit structured to impart a structured refractive index profile;

FIG. 6D is a representative plot of effective index vs. position along the waveguide of FIG. 6C with the thermal source off and no manufacturing variance;

FIG. 9 is a side view of an embodiment of a photonic integrated circuit;

FIG. 10 is a side view of an embodiment of a photonic integrated circuit; and,

DETAILED DESCRIPTION

Figure 2:
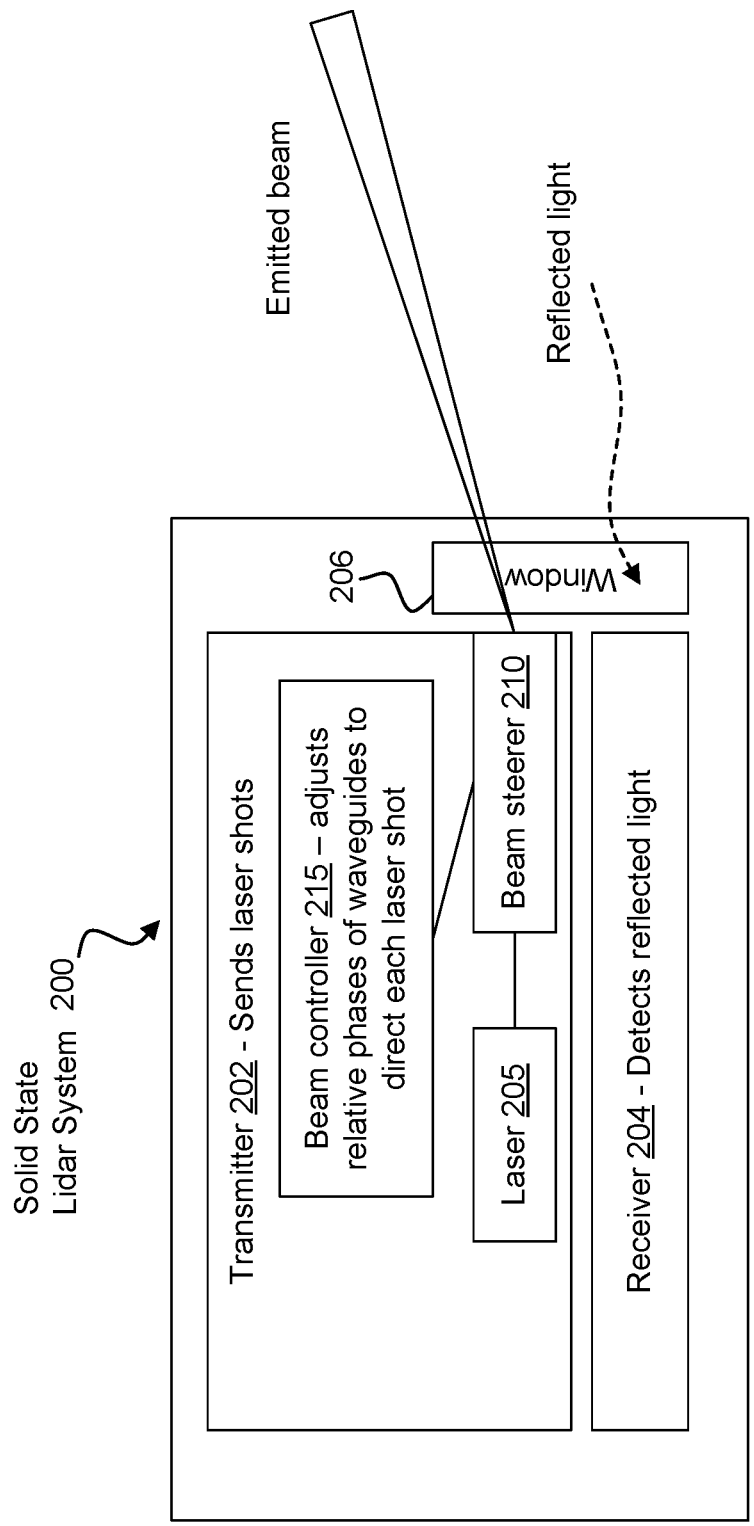
FIG. 2 is a simplified schematic of a LiDAR that may use embodiments of a photonic integrated circuit.

The present invention has application in a wide variety of applications for photonic integrated circuits. In general, the present invention may be useful where it would be useful to apply a correction to compensate for unintentional variance in the index of refraction of a photonic integrated circuit that may arise during manufacturing. In particular, the present invention may be useful for relatively larger photonic structures where it would be useful to reduce unintentional refractive index variance. By way of example, the present application describes the application of the present invention in terms of a plurality of series of antennas, such as may be found for instance, in a phased array waveguide.

The figures and description of the present application describe a representative photonic integrated circuit in terms of a phased array waveguide, for LiDAR applications. This example is intended to be demonstrative of an application that would benefit from application of the present invention, and not intended to be limiting except as defined by the scope of the claims.

When light is propagated along a waveguide that is patterned as a diffraction grating, and there is a medium (typically air) above the surface of the device, it emits light into the medium, creating a beam that is centered on an emission angle corresponding to the following well-known diffraction equation:

$$n_{effective} = n_{medium}\sin(\theta_{emission}) + \frac{m\lambda}{\Lambda}$$

where:
$\lambda$ is the wavelength of the light, defined in vacuum;
$n_{effective}$ is the effective refractive index of the waveguide, for the wavelength $\lambda$;
$n_{medium}$ is the refractive index of the medium above the waveguide, for the wavelength $\lambda$ (the medium is typically air, which has refractive index very close to 1);
$\theta_{emission}$ is the emission angle between the emitted light and the normal to the surface (or the reception angle between received light and the normal to the surface for a receiver);
m is an integer, representing the diffraction order of the beam (typical values are −2, −1, +1, +2, with +1 being the most commonly used diffraction order); and,
$\Lambda$ is the pitch of the grating (also known as the period of the grating).

As indicated by the diffraction equation, the emission angle depends upon the effective refractive index of the waveguide(s), the pitch of the waveguide(s), and the wavelength of light. This relationship becomes more clear upon rearranging the diffraction equation into the following form:

$$\theta_{emission} = \arcsin\left(\frac{1}{n_{medium}}\left[n_{effective} - \frac{m\lambda}{\Lambda}\right]\right).$$

For a given wavelength of light, if the effective refractive index of the waveguide(s), and/or the pitch of the antennas along the waveguide(s), varies along the waveguide(s), the emission angle will also vary along the waveguide(s). Changing the wavelength may be used, for instance, to scan the emission angle of a grating, and thus to scan the beam. Changing the wavelength of light may also be used to correct for an overall manufacturing error of the whole grating by adjusting the wavelength to set the beam to a desired emission angle. Differentially changing the wavelength of light between waveguides may also be used in cases where the effective index varies across the grating. Changing the wavelength of light does not, however, act to compensate for a manufacturing non-uniformity along the waveguide(s).

The present invention is described in the context of an embodiment of a photonic integrated circuit that comprises a plurality of parallel waveguides, each waveguide comprising a series of antennas. The plurality of series of antennas are thus parallel with one another and in cooperating proximity. In the case of a transmitter, by varying the phase of input light to each of the series of antennas, the cooperating proximity allows for an overall output light beam to be directed or steered, as is known in the art. This description is of only one useful example implementation, and in general the application is also applicable to a single series of antennas.

In this specification, antennas serve to couple light from the photonic integrated circuit into the surrounding environment and in this example implementation relate to an optical phased array having a transmitting function, it should be understood that an optical phased array can have a receiving function in which case the antennas serve to couple light from the surrounding environment into the photonic integrated circuit, and the apparatus has reception angles in place of emission angles, said reception angles also obeying the equations recited above. For brevity, this specification is primarily written in terms of a transmitting function, but it should be understood that the antennas may generally be input couplers, output couplers, and/or input/output couplers, depending upon a particular industrial implementation.

While the transmitter embodiments comprise a laser for emitting light, the receiver embodiments comprise a photodetector for receiving light. While the transmitter embodiments comprise antennas operative to emit light out of the plane of the substrate into the surrounding environment (i.e. to couple light from the plane of the substrate into the surrounding environment), the receive embodiments comprise light capturing elements operative to capture light from the surrounding environment (i.e. to couple light from the surrounding environment into the plane of the substrate). Nonetheless, for the purpose of calibrating or manufacturing a receiver embodiment, it may be advantageous to temporarily operate the apparatus as a transmitter by temporarily or permanently incorporating a laser, as it is relatively simple to measure the characteristics of an emitted beam, but difficult to create an incident beam. An optical switch outside or within the photonic integrated circuit may be used to selectively couple the photodetector or laser to the antennas. Alternatively, the laser may be temporarily coupled to the photonic integrated circuit, and later replaced by a photodetector.

As is known in the art, a change in refractive index of a waveguide may be induced by a change in temperature, which is known as the thermo-optic effect, and, in most waveguide structures that are suitable for an optical phased array, an increase in temperature causes an increase in refractive index (positive thermo-optic effect). Negative thermo-optic effect structures may also be used. Generally, thermo-optic features are typically used in an active portion of a waveguide, for instance to change the phase of light travelling through that active portion. In some structures the thermo-optic effect may be selectively applied to one optical branch to induce a difference of phase between that optical branch and another optical branch to which the thermo-optic effect is not applied. An example of a practical application using the thermo-optic effect is for temperature measurement, for instance by using fibre Bragg gratings (FBGs), where a temperature change may be measured by a change in wavelength shift of light passing through the grating.

As is also known in the art, the relevant refractive index is the effective index of the excited optical mode of the waveguide, which is derived from the geometry and refractive index of the constituents of the waveguide according to well-known waveguide mode analysis techniques, and in the case of a waveguide having a grating this effective index is averaged along one grating period. However, to simplify the nomenclature in this specification, we use the term refractive index.

Due to commonly-occurring manufacturing variance across a semiconductor wafer, material composition may vary, resulting in refractive index variation at different locations on the wafer. In general, the material composition is relatively smoothly varying within the manufacturing tolerance across the wafer. A photonic integrated circuit is formed on a portion of the wafer, and smaller circuits will accordingly have relatively uniform material composition across the circuit and, as a result, a consistent and uniform refractive index in that photonic integrated circuit. Larger photonic integrated circuits, however, are more likely to have inherent manufacturing variances within a single circuit that affect operation of the photonic integrated circuit as they cover a large enough area of the wafer to have differing optical properties at different locations within the same optical structure.

An example of a larger photonic integrated circuit includes, for instance, at least one waveguide comprising a series of antennas that may extend across the photonic integrated circuit through one or more regions of unintentionally varying index of refraction that arose during manufacture (i.e. an unintentional manufactured refractive index profile due to manufacturing variance that is something other than a desired or intended refractive index profile across the optical structure). Each antenna of the photonic integrated circuit may act as a coupler for coupling light between the waveguide and the environment external to the waveguide. For instance, a transmitting antenna may comprise a plurality of output couplers, while a receiving antenna may comprise a plurality of input couplers.

In some embodiments, each series of antennas may be distributed over a corresponding waveguide to provide one or more coupling regions along the waveguide. For instance, the series of antennas may comprise a continuous distribution of antennas to provide one coupling region disposed along the waveguide. Alternatively, for instance, the series of antennas may comprise two or more groups of antennas to provide a corresponding two or more coupling regions along the waveguide.

In some embodiments, the waveguide and series of antennas may be part of a larger structure. For instance, a plurality of waveguides, each comprising a corresponding series of antennas, may be arranged in parallel and located in cooperating proximity to provide an optical phased array.

Manufacturing variance may lead to changes in a manufactured refractive index profile across the plurality of waveguides, as well as along the length of the plurality of waveguides. The present application provides an additional corrective mechanism, as an alternative or as a supplement, to conventional correction techniques.

Differences in refractive index between waveguides may conventionally be corrected by active circuit components supplying the light to each of the waveguides, for instance by varying a phase or wavelength of the light input to each of the waveguides. These known correction techniques may also be useful for correcting for shifts in effective refractive index to account for circuits that are manufactured with too low an effective refractive index or too high of an effective refractive index for a particular application. The present application provides a mechanism for accounting for potential manufacturing variance by creating a thermal profile across the plurality of waveguides. The thermal profile imparting a thermally induced refractive index profile (i.e. a thermal refractive index profile) that, when combined with a manufactured refractive index profile, results in an effective refractive index profile across the plurality of waveguides that is more uniform.

Differences in refractive index along the waveguides, however, is more problematic to correct using present correction techniques. The present application provides a mechanism for accounting for potential manufacturing variance by creating a thermal profile along the length of a series of antennas. The thermal profile imparting a thermally induced refractive index profile (i.e. a thermal refractive index profile) that, when combined with a manufactured refractive index profile, results in an effective refractive index profile along the series of antennas that is more uniform.

As indicated above, manufacturing variance is generally smoothly varying across a wafer and, as a result, for a small photonic integrated circuit the profile of the refractive index will have an approximately linear gradient. In addition to this case, however, there may be cases where a circuit is large enough that a linear gradient is not a good approximation to the refractive index profile, or the variance is not smoothly varying. In these cases, it may be advantageous to provide for non-linear correction. The application generally contemplates both linear and non-linear corrections, with the linear correction being the most common type of correction required.

In some embodiments, a photonic integrated circuit may further be structured to provide an intentional structured refractive index profile that is non-uniform. The structured refractive index profile may create an offset from a desired effective refractive index profile that may be corrected by applying power to the thermal source(s) A purpose of the structured refractive index profile may be to ensure that any manufacturing variance is correctable by application of power to the plurality of thermal sources.

FIG. 1A is a top view of an example of a photonic integrated circuit 100. FIG. 1B is a side view of the example of a photonic integrated circuit from FIG. 1A. The example of FIGS. 1A and 1B is for a transmitting photonic integrated circuit. In this example, a phased array waveguide 100 is presented, as may be used, for instance, to steer laser beams for use in a LiDAR system. The phased array waveguide 100 is built on a substrate 102. FIGS. 1A and 1B are intended to be representative, and the number of waveguides, length of the array (L), and width of the array (W) are not to scale. A laser 105 supplies light to a beam splitter 110 that splits the input laser beam into a plurality of phased array waveguides 115. An emitted output optical beam has an expected near-field cross-sectional profile 120 as indicated in FIG. 1A.

In this example, and the other examples provided in this application, each of the waveguides of the plurality of phased array waveguides 115 comprises a series of antennas extending along that waveguide. In the simplified example of FIGS. 1A and 1B, and the rest of the Figures in this application, an observable discrete number of antennas are visible as the figures are not to scale. In practical implementations the length L of the array may be much larger than the width W of the array. Similarly, the separation between each waveguide may be quite small in comparison to the width W and the length L. While a discrete number of antennas are visible, in many practical implementations a much larger number of antennas may be presented with quite small separation between each antenna. Accordingly, on a scale diagram of a practical implementation it may be difficult to distinguish between features.

These examples are intended to be representative of photonic integrated circuits, and the number of waveguides, length of the array (L), width of the array (W), size of the antennas, number of antennas, and pitch of the antennas illustrated are for illustration purposes and do not necessarily represent typical lengths or numbers of in a practical implementation. By way of example only, an illustrative application using 1550 nm light may use an array having a length L of about 7 mm and a width W of about 4 mm. The number of waveguides may vary depending upon application, but as an example there may be about 2000 separate waveguides with about a 2 µm pitch between waveguides. Each waveguide comprising a series of antennas. As an example, there may be around 9000 grating periods with a 0.8 µm pitch as the center-to-center distance between antennas. These dimensions and measurements are intended to be presented for illustrative purposes only, and the specific number of waveguides, length of the waveguides, number of antennas, and spacing between antennas will vary depending upon the application and wavelength of light used.

FIG. 2 is a simplified schematic of a LiDAR system 200 that may use embodiments of a photonic integrated circuit. In this example application, a transmitter 202 includes a laser 205 that generates laser shots that are to be steered by a beam steerer 210 for emission through a window 206. A receiver 204 is operative to capture and detect reflected light, that may arrive, for instance, through the window 206. In this application the beam quality of the emitted beam (i.e. divergence) is important as it affects the accuracy of the measurement made by the LiDAR system 200. For example, if the divergence of the emitted beam is large, the LiDAR may not distinguish between objects in the environment with high resolution.

Figure 3A:
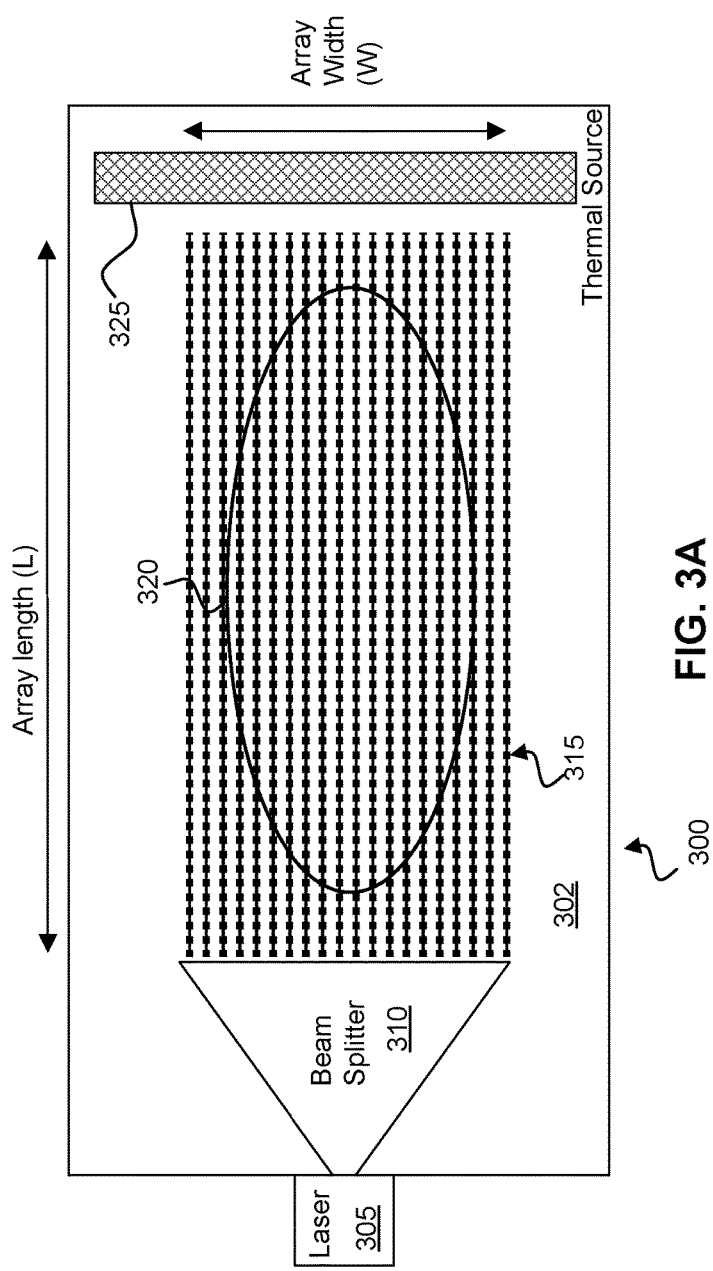
FIG. 3A is a top view of an embodiment of a photonic integrated circuit.

FIG. 3A is a top schematic of an embodiment of a photonic integrated circuit 300. The photonic integrated circuit 300 includes an optical phased array comprising a plurality of waveguides 315, wherein each waveguide 315 comprises a series of antennas, represented visually in FIG. 3A as the notches along each waveguide 315, said antennas being distributed or discrete. The photonic integrated circuit 300 is built on a substrate 302.

The material for the photonic integrated circuit 300 may comprise semiconductor and/or dielectric materials, such as for instance:
  silicon waveguide core with silica cladding
  silicon oxynitride core with silica or silicon oxynitride cladding
  III-V semiconductor core and cladding including indium phosphide, gallium arsenide, gallium aluminum arsenide, indium gallium arsenide phosphide
  lithium niobate
  glass with diffused dopant Fabrication processes may comprise standard manufacturing processes such as conventional lithographic patterning, lateral etching, ion implantation, and/or diffusion of atoms or ions. The waveguides 315 may each comprise one core layer or multiple core layers. The waveguide cores may be patterned by means of etching, where the etching may partially or fully etch through the core to remove material. Such etching may modify the width and/or thickness of the waveguide cores. Alternatively, the waveguide cores or the waveguide claddings may be patterned according to a density of implanted or diffused atoms or ions.

The thickness of the waveguide core and the patterning may be nominally constant along the waveguide, or said thickness and/or said patterning may vary by design so as to create desired optical properties such as effective refractive index and strength of emission from the optical phased array.

A laser 305 supplies the input light beam and a beam splitter 310 divides the input light beam across the plurality of waveguides 315. The beam splitter 310 may comprise passive and/or active components. In the case the beam splitter 310 includes active components, it may also be a source of heat on the photonic integrated circuit 300. The active components, such as phase controllers, may be used to steer the output beam by varying the phase between the waveguides 315. In some embodiments, the active components may further apply a correction to input light between waveguides to account for manufacturing variances that may create an unintentional index of refraction gradient across the width of the plurality of waveguides 315 (i.e. refractive index differences between waveguides 315). Thus, it should be understood that the beam splitter 310 may split the input light beam from the laser 305 into a series of output light beams, each respectively input into a corresponding waveguide 315, with a well-defined splitting ratio and a well-defined phase relationship, either or both of which may be adjustable to steer the output beam.

The operating wavelength of the laser 305 in this example is intended to be anywhere from the visible to near infrared, typically 400 nm to 10 micrometres. In particular, operation at 905 nm is favorable owing to low cost laser diodes and invisibility to human eye, and operation at 1550 nm is favorable owing to maturity of fiber lasers and large eye safe power limit. The laser 305 may have a tunable wavelength or may have a fixed wavelength. In the case of a tunable wavelength laser, tuning the wavelength may be used to steer the beam emitted from the optical phased array along the direction parallel to the waveguides 315.

Whereas the waveguides 315 are illustrated as continuous and straight and having the emitting grating all the way along the OPA region, other layouts may be possible such as waveguides having regions without gratings, and layouts comprising curved waveguides. In general, the structure may be described as at least one series of antennas. In some embodiments, each of the at least one series of antennas may be distributed as a single coupling region, or may be distributed to define more than one coupling region, depending upon implementation requirements. In the figures of the present application, the antennas are illustrated as being evenly distributed along each waveguide 315 to make up one coupling region for each waveguide 315. In some embodiments, antennas may be distributed to define more than one coupling region on each waveguide. In some embodiments, antennas may be distributed uniformly across the coupling region(s). In some embodiments, antenna distribution may be different in at least one of the coupling regions from the other coupling region(s).

It should be further understood, as understood in the art, that the strength of the emission region(s) varies along the waveguide such that the local intensity of the emitted beam has a desired shape, typically a Gaussian beam with large intensity in the middle falling to lower intensity at the wings, said type of beam having the lowest divergence in the far field. Throughout this specification an optical intensity shall be understood to mean an optical power of a continuous wave optical beam, or an optical energy or time-averaged optical power of a pulsed optical beam.

Referring to FIG. 3A, a thermal source 325 is located at a thermal source end of the waveguides 315. Referring to side view FIG. 3B, a thermal sink 330 is provided spaced apart from the thermal source 325 at an opposed thermal sink end of the waveguides 315. The thermal sink is preferably formed using a material having higher thermal conductivity than the rest of the substrate 302, such as a metal. In this embodiment the thermal sink 330 is conveniently located under the beam splitter 310 to act as a sink not just for the thermal source 325, but also to act as a sink for any heat generated by active components of the beam splitter 310 so their heat does not affect the temperature profile of the substrate 302 under the waveguides 315.

In the context of a single waveguide, the thermal source 325 and the thermal sink 330 bracket a series of antennas for that waveguide. Applying heat at the thermal source 325 induces a temperature gradient between the thermal source 325 and the thermal sink 330, and as a result a temperature gradient along the series of antennas, i.e. parallel to and along the optical path within each waveguide. Heat may be applied at the thermal source 325 by for example applying an electrical power to the thermal source 325. As a result of the temperature gradient, an index of refraction gradient is induced along the series of antennas.

In some embodiments, the thermal source comprises a heater, and applying the electrical power to the heater generates thermal heat at the thermal source location.

In an embodiment, the index of refraction may have a positive, or a negative, linear variation with respect to distance from the thermal sink 330, induced by a corresponding positive, or negative, thermo-optic effect, and the slope of this variation may be linearly proportional to the thermal differential between the thermal source 325 and the thermal sink 330.

In order to correct for an unintentional manufactured refractive index profile, electrical power may applied to the thermal source at a pre-determined power level that generates a temperature gradient sufficient to compensate for the manufactured refractive index profile.

The pre-determined power level may be obtained using a calibration procedure in which electrical power is incrementally applied to the thermal source 325. In the case of a transmitter, at each increment, a measurement may be taken of the output optical beam to measure the beam quality of the output optical beam. The beam quality may be measured, for instance, by a divergence angle of the output optical beam. Incrementing the electrical power may include, for instance, scanning, stepping, iterating, or walking-in the electrical power. Measuring the beam quality may consist, for instance, of measuring the M-squared parameter, or the width of the far-field beam at a certain intensity such as the full-width or half-width at the half maximum intensity point or the $1/e^2$ intensity point. The measurement may be performed along one axis or two axes, where a lower M-squared parameter or a smaller width indicates a higher quality ("tighter") optical beam. The M-squared parameter is well-known in the art as a measure of the quality of an optical beam as compared to an ideal Gaussian beam.

When the measured beam quality meets a pre-defined tolerance (e.g. M-squared parameter), sufficient compensation has been applied to oppose the manufactured refractive index profile that unintentionally arose due to manufacturing variance to produce a beam of light with a desired beam quality. For instance, an optical beam that meets the desired beam quality may have a divergence angle smaller than a pre-defined tolerance angle.

The thermal source power corresponding to the measured sufficient compensation may be locked in to fix the currently applied electrical power level as the pre-determined power level which may subsequently be used in operation of the photonic integrated circuit 300. The correction procedure may, for instance, be implemented a single time at the time of manufacture of the photonic integrated circuit 300. In some embodiments, the correction procedure may be implemented multiple times including at times after the manufacture of the photonic integrated circuit 300 to enable re-calibration of the photonic integrated circuit 300.

In the case of a receiver, a similar calibration procedure may be implemented. In this case a beam of light is directed at the receiver at a pre-determined beam angle and optical beam intensity. In this case the power to the thermal source may be adjusted until the received beam of light meets a pre-determined threshold level. The receiving antennas may be calibrated to maximize reception at the pre-determined beam angle. In the case of a receiver, the beam quality comprises a quality of the received beam as received by the at least one series of antennas.

Figure 3B:
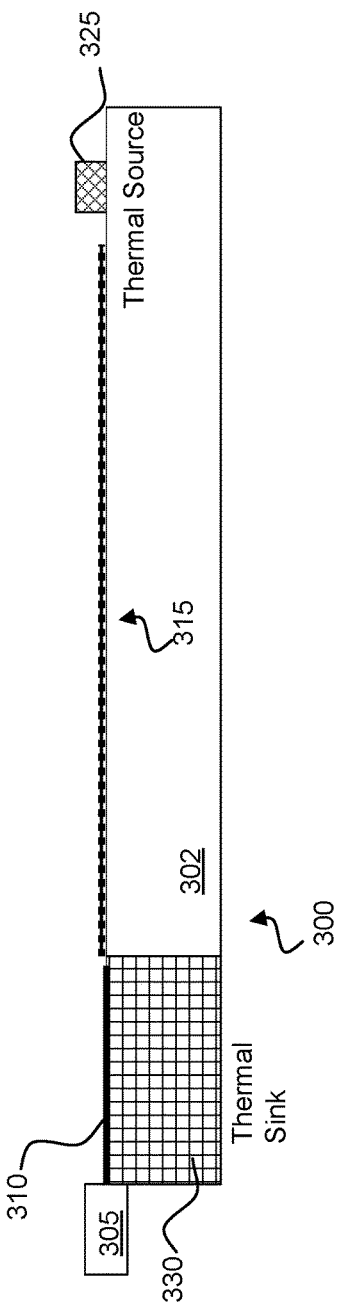
FIG. 3B is a side view of the embodiment of FIG. 3A.
Figure 3C:
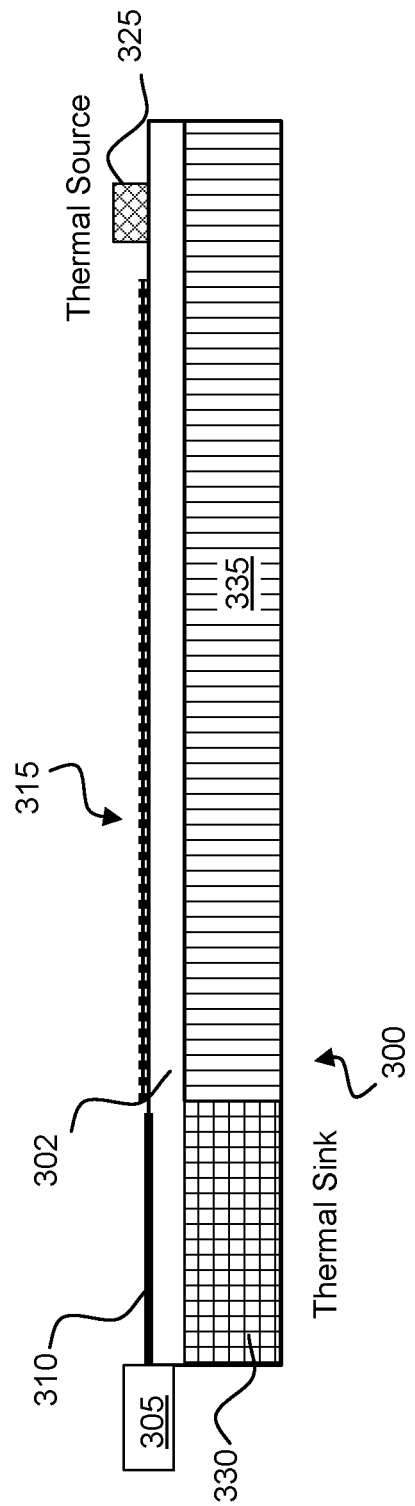
FIG. 3C is a side view of an alternate embodiment of a photonic integrated circuit.

FIG. 3C is a side view of an alternate embodiment of the photonic integrated circuit 300. In the embodiment of FIG. 3C, an insulating layer 335 extends across a bottom surface of the substrate underneath the waveguides 315 and between the thermal source 325 and the thermal sink 330. The insulating layer 335 may be formed from a variety of materials including a potting compound, plastic, or coating applied after completion of the semiconductor manufacturing processes. Alternatively, the insulating layer 335 may form part of the initial substrate 335 on which the components such as the beam splitter 310 and the waveguides 315 are built. The thermal resistance from top to bottom through the insulating layer 335 may be larger than the thermal resistance from the thermal source 325 to the thermal sink 330, such that the majority of heat flow is along the substrate 302, resulting in a temperature gradient along the substrate 302 from the thermal source 325 to the thermal sink 330.

In the example of FIG. 3C the thermal sink 330 is separated from the beam splitter 310 by a thin substrate layer 302. This is, by way of example only, a typical construction with an insulating layer separating the active components from a conductive thermal sink 330 such as a metal thermal sink. In other embodiments the thermal sink 330 may provide the base for the beam splitter 310, depending upon the material requirements of a particular structure.

Figure 4:
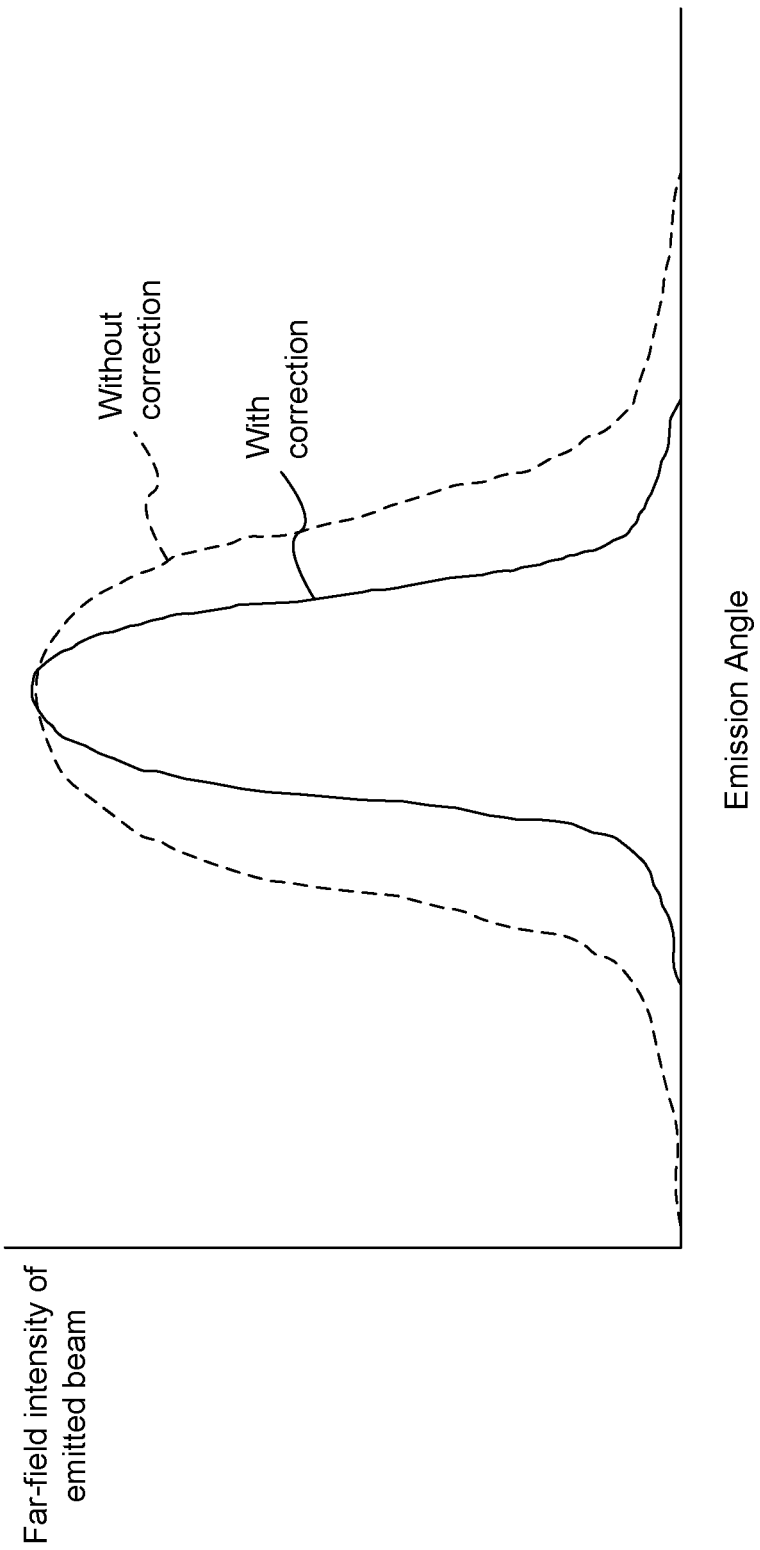
FIG. 4 is a representative plot illustrating the effect of applying the correction using an embodiment of a photonic integrated circuit.

FIG. 4 is a representative sketch plot illustrating the effect of applying the correction using an embodiment of a photonic integrated circuit. In the example of FIG. 4, the beam quality is represented as a divergence angle of a transmitted optical beam. The plot shows the far-field intensity of the emitted beam versus the emission angle, and the divergence angle is proportional to the width of this intensity profile. As illustrated, in FIG. 4, by applying compensation in the form of a corrective thermal profile along each series of antennas, the output beam may be tightened to reduce the divergence angle. With correction, the far-field of the emitted beam may have a smaller divergence angle than would otherwise be the case.

Figure 5:
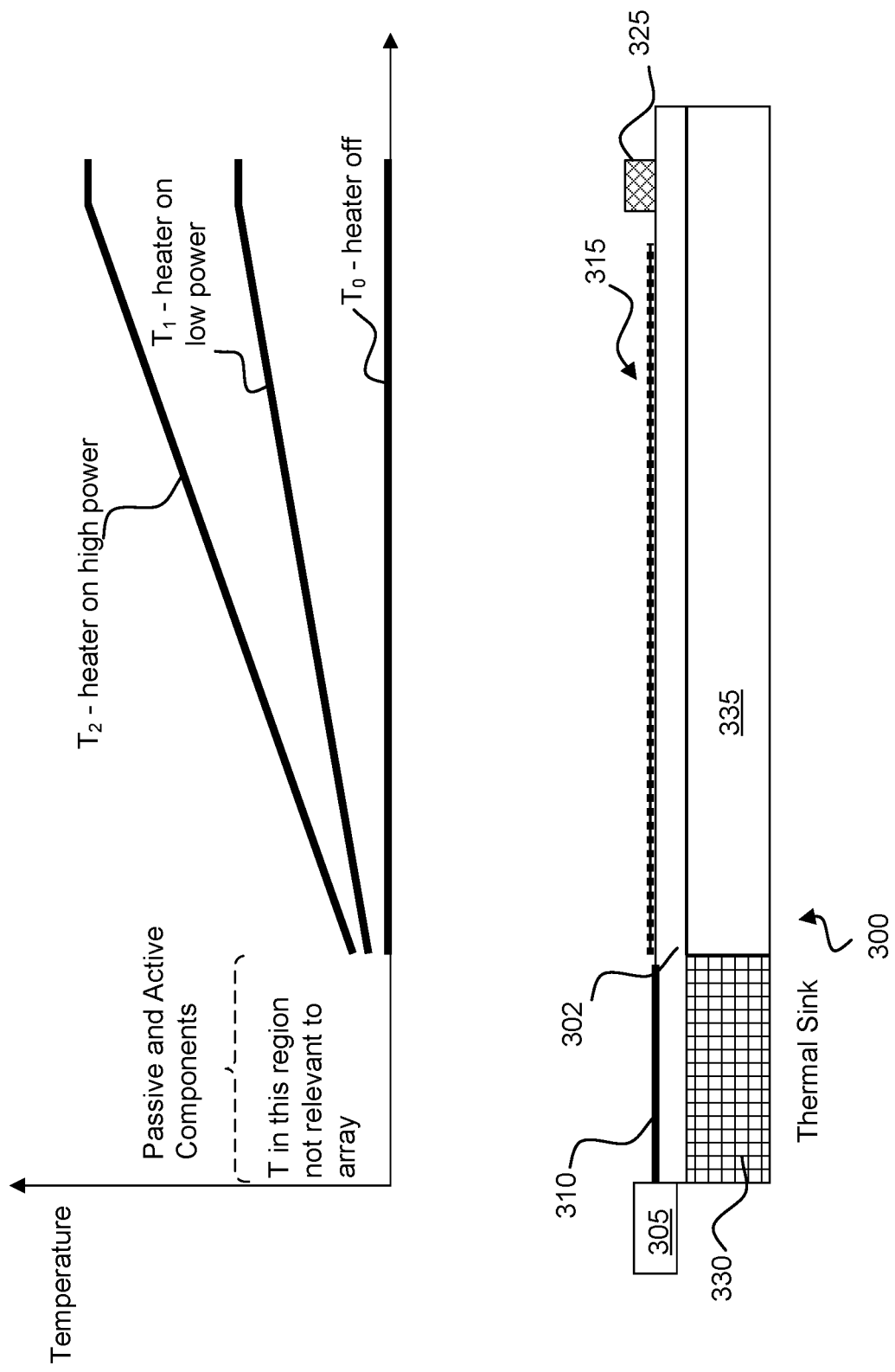
FIG. 5 is a representative plot illustrating thermal gradient varying with thermal source power with reference to the embodiment of FIG. 3C.

FIG. 5 is a representative plot illustrating thermal gradient varying with thermal source power with reference to the embodiment of FIG. 3C. The horizontal axis of the graph in the upper part of FIG. 5 represents a corresponding position along the physical embodiment illustrated in the lower part of FIG. 5, although the diagrams are not to scale. As indicated, the beam splitter 310 is adjacent to the thermal sink 330, and as a result heat generated by active components in this region flows primarily to the thermal sink 330, rather than affecting the thermal gradient in the waveguides 315. FIG. 5 illustrates the effect of no thermal source power ($T_0$), low thermal source power ($T_1$), and high thermal source power ($T_2$) on the thermal gradient under the waveguides 315.

Figures 6A, 6B:
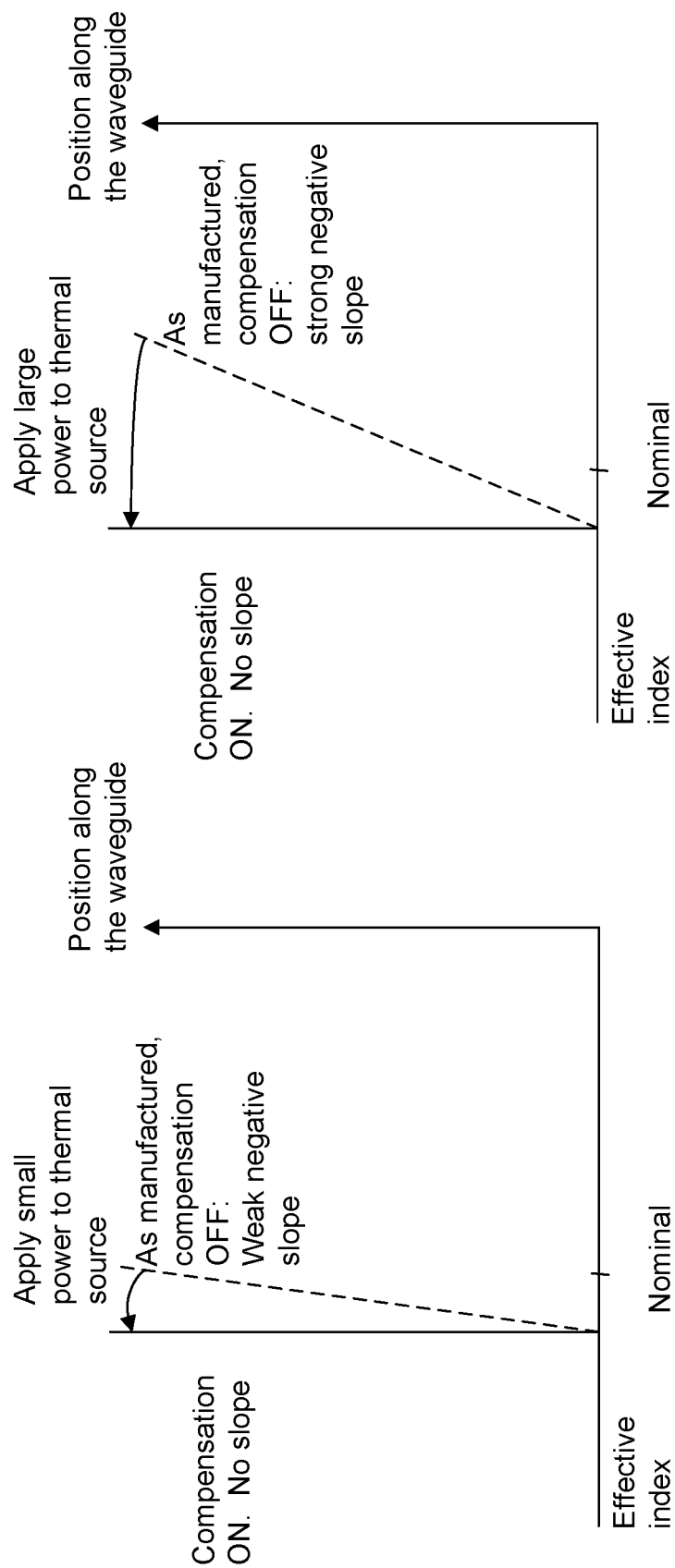
FIG. 6A is a representative plot illustrating application of compensation to correct a relatively small unintentional refractive index gradient.
FIG. 6B is a representative plot illustrating application of compensation to correct a relatively large unintentional refractive index gradient.

FIG. 6A is a representative plot illustrating application of compensation to correct a relatively small unintentional manufactured refractive index profile in the form of a manufactured refractive index gradient. As illustrated, it is desired to have no variation in the effective refractive index profile along a particular waveguide. If this is the case, then each antenna in the series will have a same effective refractive index as other antennas in the series, and there will not be unintended variance between antennas. In the case where there is a small unintentional manufactured refractive index profile in the form of a manufactured refractive index gradient arising from manufacture, compensation may be applied by applying power to the thermal source 325. Applying the power results in a temperature gradient being induced along the series of antennas between the thermal source 325 and the thermal sink 330. The temperature gradient will similarly induce an opposing thermal refractive index profile along the series of antennas between the thermal source 325 and the thermal sink 330. By adjusting a level of the applied thermal source power, the slope of the opposing thermal refractive index profile may be adjusted until the manufactured refractive index profile is cancelled by the opposing thermal refractive index profile.

FIG. 6B is a representative plot illustrating application of compensation to correct a relatively large unintentional manufactured refractive index gradient. FIG. 5B is similar to FIG. 6A, but illustrates that a larger unintentional manufactured refractive index gradient may be compensated by applying more power to the thermal source 325.

If the unintentional manufacturing refractive index profile that arose due to manufacturing variance may be such as to require a lower temperature at the thermal source 325 than the thermal sink 330 will need to have a higher temperature than the thermal source 325 in order to achieve a uniform effective refractive index profile. In some embodiments, the thermal source 325 may be operative to either heat or cool the substrate 302. However, some thermal sources, such as resistive heaters, can only increase temperature, and cannot reduce temperature. While it is possible to select a thermal source 325 operative to provide cooling and/or both heating and cooling capabilities, in general, coolers (for example thermo-electric coolers) are difficult to assemble onto a photonic integrated circuit and themselves generate waste heat that is hard to dissipate.

In some more advantageous embodiments, where the thermal source 325 is only capable of heating or cooling (generally a heater only capable of heating), in order to ensure that the manufactured refractive index profile is correctable by application of a thermal refractive index profile (i.e. the manufactured refractive index profile has opposite slope to the opposed thermal refractive index profile induced by the thermal source), a structured refractive index profile may be "built" into the photonic integrated circuit 300 by varying the structure of the series of antennas along their length. The structured refractive index profile providing an "offset" from the ideal effective refractive index profile that is correctable by the thermal source 325. Generally, the offset may be a large enough refractive index gradient to account for expected manufacturing variance.

For instance, referring to FIG. 6C as an example, a plurality of parallel waveguides 615 are located on a substrate 602. A thermal source 625 is located at a thermal source end of the waveguides 615. As with examples provided above, each of the waveguides 615 comprises a series of antennas along its length. Visual depictions of the antennas are omitted from FIG. 6C for clarity. In the example of FIG. 6C a width of each of the waveguides 615 tapers from the thermal sink end to the thermal source end 625 to create a structured refractive index profile in each of the waveguides 615.

Different cross-sections can be implemented to impart a structured refractive index profile, for instance by varying, along a waveguide 615, the width or depth of a lithographic feature that is rendered into the PIC by means of etching, implantation or diffusion.

Alternatively, as another example, a mark-to-space ratio of the antennas along each series of antennas may be varied to create a structured refractive index profile. The mark-to-space ratio in this context being a ratio of the length of each antenna to the length of material between each antenna. Other methods for structuring each waveguide to have a structured refractive index profile may be used, as may be apparent to a person of skill in the art.

Alternatively, in place of creating a structured refractive index profile, the at least one series of antennas may be structured to directly vary emission angle along the length of the at least one series of antennas. For instance, a pitch of the antennas of a series may be varied along the length of the series. The pitch is a physical center-to-center distance between each antenna. The varied pitch may be established, for instance, during manufacture such as by laying out the antennas lithographically with a desired variation in pitch.

If the apparatus is perfectly manufactured, and no power is applied to the thermal source 325, the emission angle will vary along the length of the length of the series, because the emission angle of a series of antennas is related to both its pitch and the refractive index averaged across that series. In particular, the pitch may decrease from the thermal source end to the opposed thermal sink end when the thermal source is a heater and no power is applied to the thermal source. In this case, by applying heat at the thermal source end, by means of positive thermo-optic effects, a thermal refractive index profile may be applied to the series of antennas to compensate for the variation in pitch, causing a more consistent emission angle along the series of antennas, thus reducing the divergence of the beam and improving the beam quality.

In this embodiment the effective refractive index profile may not be uniform once the photonic integrated circuit has been calibrated, but the emission angle will be uniform along the at least one series of antennas as emission angle is a function of both effective refractive index and pitch (as explained above).

Thus, for a transmitter the at least one series of antennas comprises at least one series of transmitting antennas. In this example, the at least one series of transmitting antennas may be structured (such as by varying pitch) to provide a variation in emission angle along the length of the at least one series of transmitting antennas. Alternatively, the at least one series of transmitting antennas may be structured to impart a varied structured index of refraction profile along the length of each of the at least one series of transmitting antennas. Examples of such structuring may include the varied cross-sections and antenna pitch examples provided above. Alternatively, other structuring such as material type, depth, or addition of other materials such as coatings may be used to vary the index of refraction profile or the emission angle along the series of antennas.

In varying the cross-section, the parameters of the cross-section that can be varied include the width of the core, the thickness of the core, the composition of core and/or cladding. Metamaterials can also be used, wherein a material is patterned at a characteristic length that is much less than the operating wavelength, so that the light passing through the waveguide is affected by a metamaterial having a refractive index that is shifted from the refractive index of the underlying material. As known in the art, the mark-to-space ratio of the patterning of the metamaterial can be varied lithographically, such that the refractive index of a material in the waveguide changes along the length of the waveguide.

Referring to FIG. 6D, this inherent structured refractive profile may comprise a index of refraction gradient that creates an initial offset refractive index gradient to ensure any manufacturing variance will result in a gradient that can be corrected by applying heat at the thermal source 625.

Figure 6E:
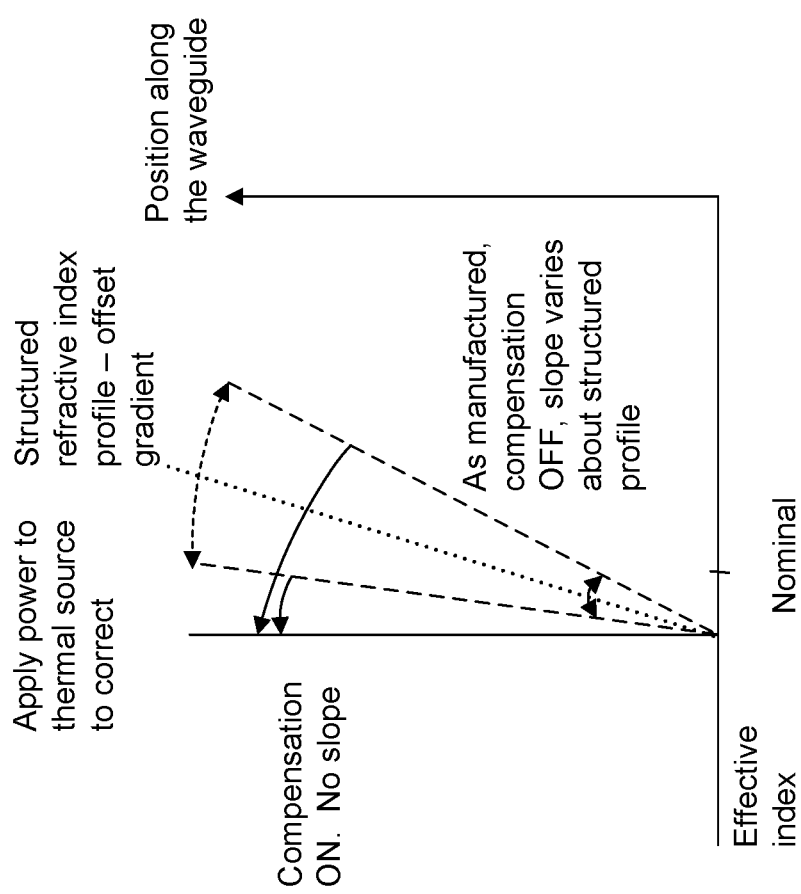
FIG. 6E is a representative plot of effective index vs. position along the waveguide of FIG. 6C showing a structured refractive index profile combined with manufacturing variance.

Referring to FIG. 6E, the initial offset gradient ensures that expected variance due to manufacturing, i.e. a positively or negatively sloped unintentional index of refraction gradient, may be corrected by application of power to the thermal source 325. As a result of a structured refractive index profile, i.e. a structured refractive index gradient in this example, variation in the unintentional manufactured refractive index gradient due to manufacturing variance comprises a variation about the offset gradient and accordingly will not result in an overall refractive index gradient of the same slope sign as an applied thermal refractive index profile, such as an applied thermal refractive index gradient.

The cross-sectional profile of the waveguides 615 may be modified in a variety of ways. For instance, a cross-sectional profile of each waveguide 615 may decrease from the opposed thermal sink end to the thermal source end to create an inherent structured refractive index profile in the form of a structured refractive index gradient along each waveguide 615. A depth of each waveguide 615 may decrease from the opposed thermal sink end to the thermal source end to create an inherent structured refractive index profile that comprises a structured refractive index gradient along each waveguide 615.

In the example of mark-to-space variation, the physical center-to-center distance between successive antennas of a series may be consistent, but the relative size of each antenna to its spacing to the next antenna may vary along the length of the series, to create refraction structured refractive index gradient along each waveguide 615.

Figure 7:
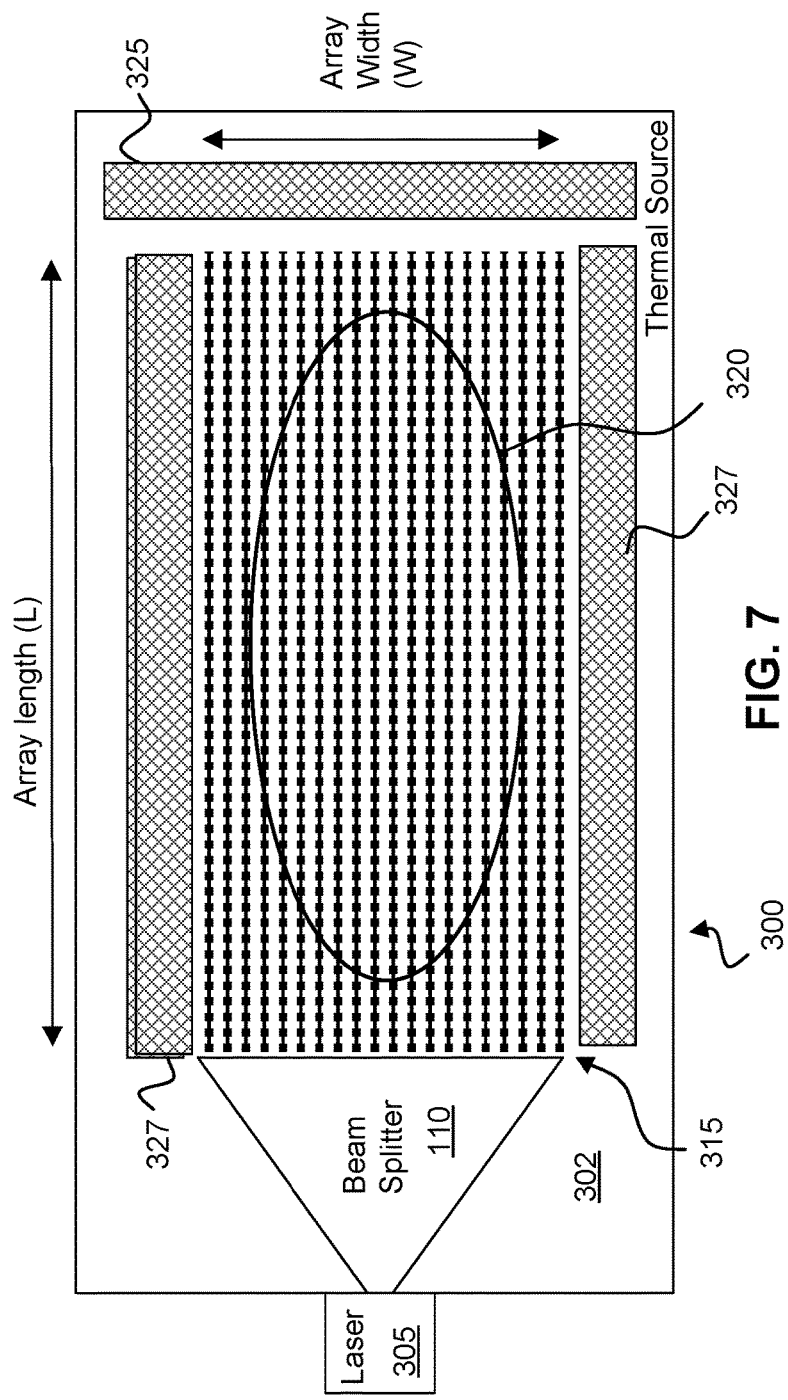
FIG. 7 is a top view of an embodiment of a photonic integrated circuit.

FIG. 7 is a top schematic of an embodiment of a photonic integrated circuit 300. In this embodiment at least one other thermal source 327 is provided between the thermal source end and the opposed thermal sink end. In this embodiment the thermal source 327 is located along-side and parallel to the waveguides 315 to correct for unintentional manufactured refractive index profile across the substrate 302 in a direction perpendicular to the waveguides 315. In this example there are a pair of opposed thermal sources 327 located on a top surface of the photonic integrated circuit 300. In some embodiments, there may be one thermal source 327 and/or a plurality of thermal sources 327 along one or both sides of the waveguides 315.

In calibration, each of the opposed thermal sources may alternatively be tested by incrementally adjusting power to that thermal source and remeasuring the beam quality of the emitted beam of light. When the beam quality meets a pre-defined tolerance, locking the power to that thermal source may be locked to change the thermal gradient set along the at least one series of antennas.

Figure 8:
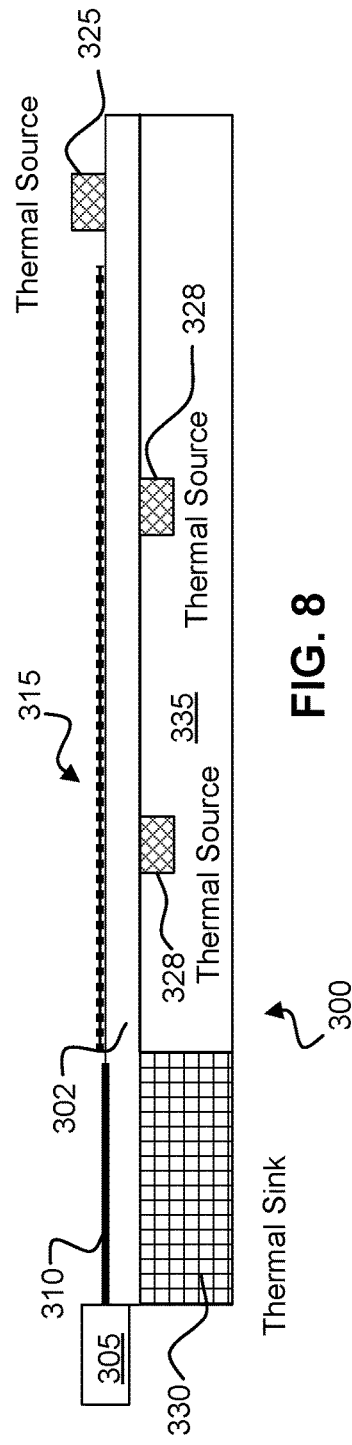
FIG. 8 is a side view of an embodiment of a photonic integrated circuit.

FIG. 8 is a side view of an alternative embodiment of a photonic integrated circuit 300. In this embodiment at least one other thermal source 328 is provided between the thermal source end and the opposed thermal sink end. In this embodiment the at least one thermal source 328 includes two thermal sources 328 located beneath and across at least a portion of the width of the substrate 302 to correct for unintentional index of refraction gradients that may vary in slope along the length of the waveguides 315. Thus, whereas the embodiment of FIG. 3A can only apply an essentially linear (first-order) temperature gradient along the waveguide, the embodiment of FIG. 8 can apply a higher order temperature gradient, wherein the order is equal to or less than the total number of thermal sources 325 and 328. For example, the illustrative apparatus of FIG. 8 has a total of three thermal sources, and thus may effect a linear, quadratic or cubic temperature gradient. Such embodiment may thus compensate for higher-order variances in manufacturing versus position, such as, in this example, linear, quadratic or cubic variance.

In this example the at least one other thermal source 328 is located under the substrate 302 and in the insulating layer 335. In other embodiments the at least one other thermal source 328 may be located in the substrate 302, above the substrate 302, and potentially above the waveguides 315 if transparent to the output beam. The thermal sources 325 and 328 may be spaced uniformly or non-uniformly.

Similar to the case for FIG. 7, the at least one other thermal source of FIG. 8 may be evaluated independently to see if the beam quality improves for a given setting.

FIG. 9 is a side view of an alternative embodiment of a photonic integrated circuit 300. In this embodiment, similar to the at least one other thermal source 328 from FIG. 8, the thermal source 325 may be located under the plane of the waveguides 315, such as in the substrate 302 (as indicated) or in the insulating layer 335 (not shown in FIG. 9).

FIG. 10 is a side view of an alternative embodiment of a photonic integrated circuit 300. In this embodiment the thermal source 325 and the thermal sink 330 have switched ends of the waveguides 315, as compared to their respective positions of FIG. 3A. This embodiment may be useful, for instance, where there are no active components in the beam splitter 310, or if the heat generated by the active components do not affect the temperature profile under the wave guides 315. The thermal source 325 in this embodiment is illustrated as being above the waveguides 315, but it could similarly be located below the waveguides.

Figure 11:
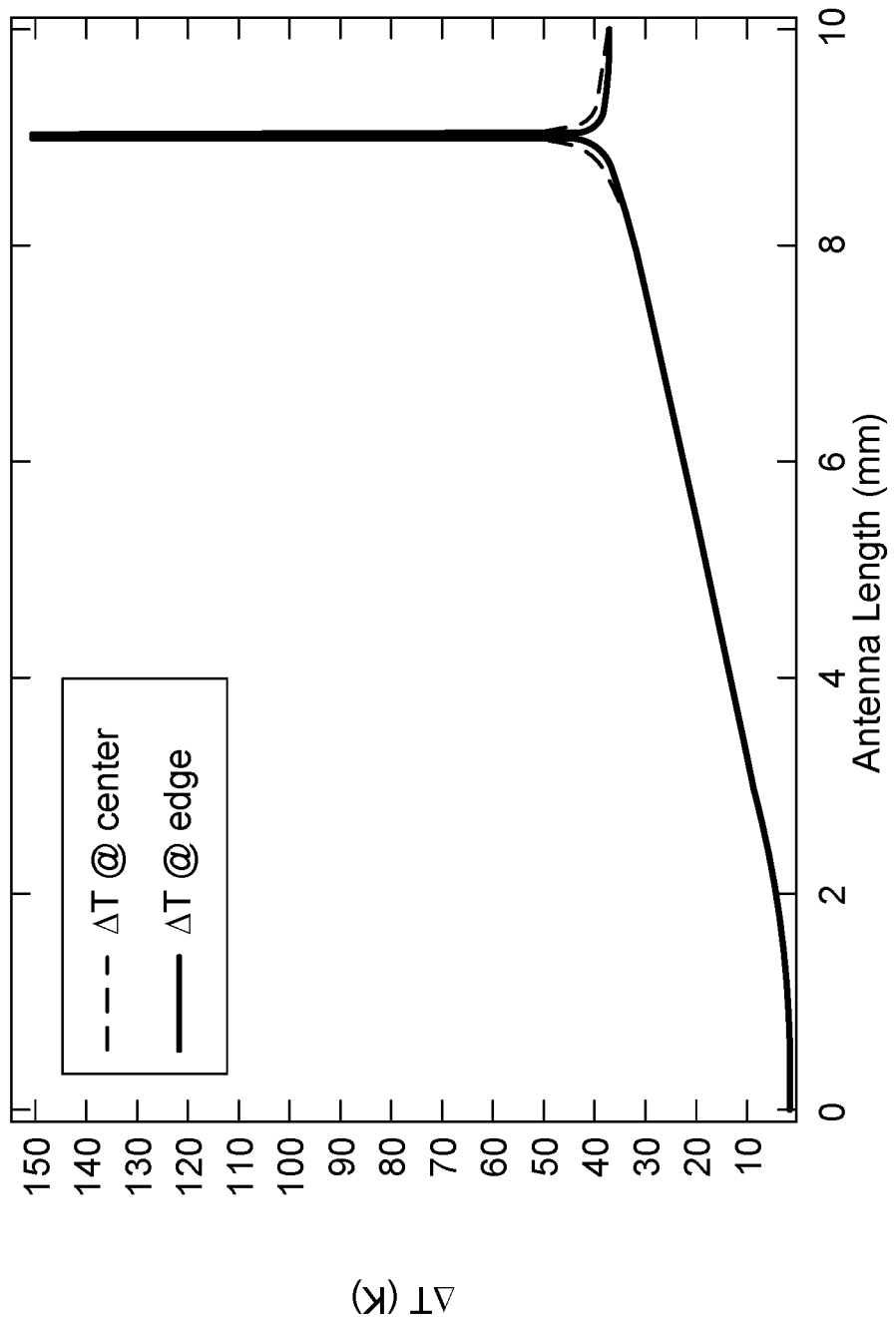
FIG. 11 is a representative plot illustrating a thermal gradient profile for an example photonic integrated circuit with power applied to a thermal source.

FIG. 11 is a representative plot illustrating a thermal gradient profile for an example model of a photonic integrated circuit 300 with power applied to a thermal source. This plot was generated based on a model similar to the embodiment of FIG. 3C. The plot is intended to be illustrative only as values will vary depending upon material choice and dimensions of the photonic integrated circuit 300. In this example, the thermal source is set to ~150K above ambient and a thermal gradient is produced which slopes toward the thermal sink which is located between 0 to 2 mm in the model. As illustrated by this model, the variance in the temperature across the width of the photonic integrated circuit (from center to edge, as illustrated by the respective dashed and solid line) is expected to be minimal, and as a result an unexpected thermal gradient across the width of the photonic integrated circuit is unlikely to occur.

Figure 12A:
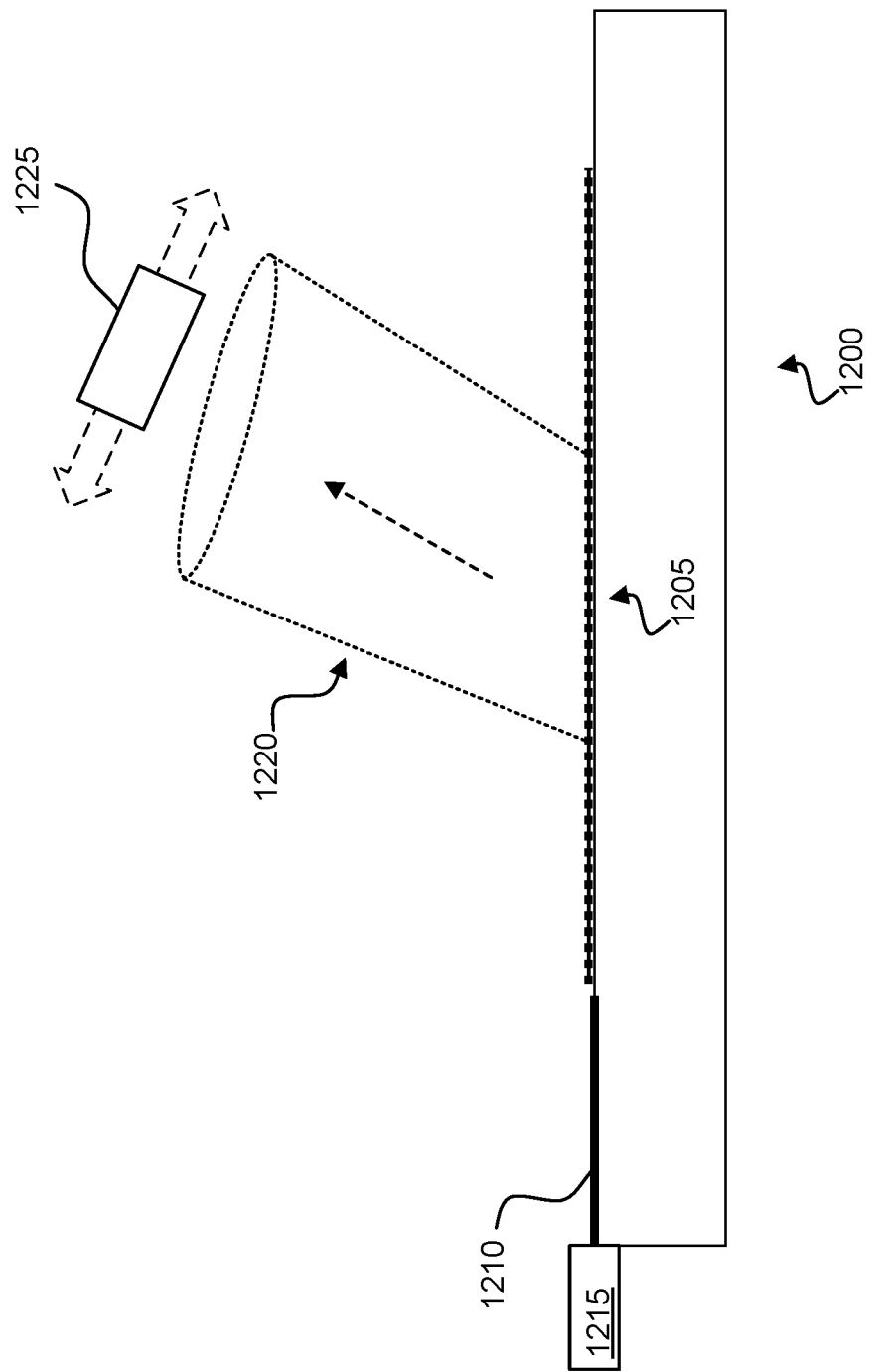
FIG. 12A is a side view of an embodiment of a system for characterizing a photonic integrated circuit.

FIG. 12A is a side view of an embodiment of a system for characterizing a photonic integrated circuit 1200, such as a phased array, by receiving an emitted light beam 1220 that is emitted by the photonic integrated circuit 1200. The phased array 1205 is supplied with light produced by a source 1215, such as a laser, that is coupled to a beam splitter 1210 that distributes the supplied light to at least one series of antennas 1205 that make up the phased array. The at least one series of antennas 1205 emits the light beam 1220. Elements for coupling the laser 1215 to the photonic integrated circuit 1200 are not specifically illustrated, but may comprise fiber, lens, or just chip-to-chip coupling, as is known in the art. FIG. 12A is not to scale, and accordingly the relative orientation and relative scale of the components are illustrative only.

Characterizing the emitted light beam 1220 provides a representation of the far field angular distribution of the emitted light beam 1220. An emitted light beam 1220 with a wider far field angular distribution has lower resolution and, accordingly, is considered to be of poor quality as compared with an emitted light beam 1220, pulsed or continuous, that has a relatively narrower far field angular distribution.

A beam profiler 1225 is located to receive the emitted light beam 1220. The beam profile 1225 operative to measure an optical intensity profile of the light beam 1220. In some embodiments, the beam profiler 1225 may be situated on a stage operative to scan the beam profiler 1225 in one or more dimensions to fully map out the optical intensity profile. In some embodiments, the beam profiler 1225 may include a stage for mechanically scanning the beam profiler 1225 in one or more directions. The beam profiler 1225 of FIG. 12A is operative to mechanically scan in one direction, to characterize the emitted light beam 1220. In some embodiments the beam profiler 1225 may comprise a movable mirror used in combination with a fixed photodetector to scan the emitted light beam 1220.

The beam profiler 1225 comprises a photodetector operative to receive one or more light wavelengths corresponding at least to the wavelength(s) of the emitted light beam 1220. The photodetector may be a single photodetector, a 1D array of photodetectors, or a 2D array of photodetectors. In some embodiments the photodetector may comprise a 2D array of sufficient size that it is not necessary to mechanically scan the beam profiler 1225 in order to characterize, i.e. profile a sufficient portion of, the emitted light beam 1220.

In some embodiments, the orientation of the light capturing surface of the beam profiler 1225 may be parallel to the at least one series of antennas 1205 of the photonic integrated circuit 1200 being calibrated. In some embodiments, the light capturing surface of the beam profiler 1225 may be oriented at an angle to the at least one series of antennas of the photonic integrated circuit being calibrated. In a preferred arrangement, the light capturing surface of the beam profiler 1225 is normal to an intended emitting angle of the emitted light beam 1220, as illustrated in FIG. 12A.

In some embodiments, the beam splitter 1210 may be an active beam splitter, as described above with respect to beam splitter 310, and may be adjustable by means of an electrical driver. In such an embodiment, the beam splitter 1210 may be calibrated, by means of repeatedly characterizing the emitted light beam 1220 as described above, and adjusting the beam splitter 1210 to produce a desired beam profile.

Figure 12B:
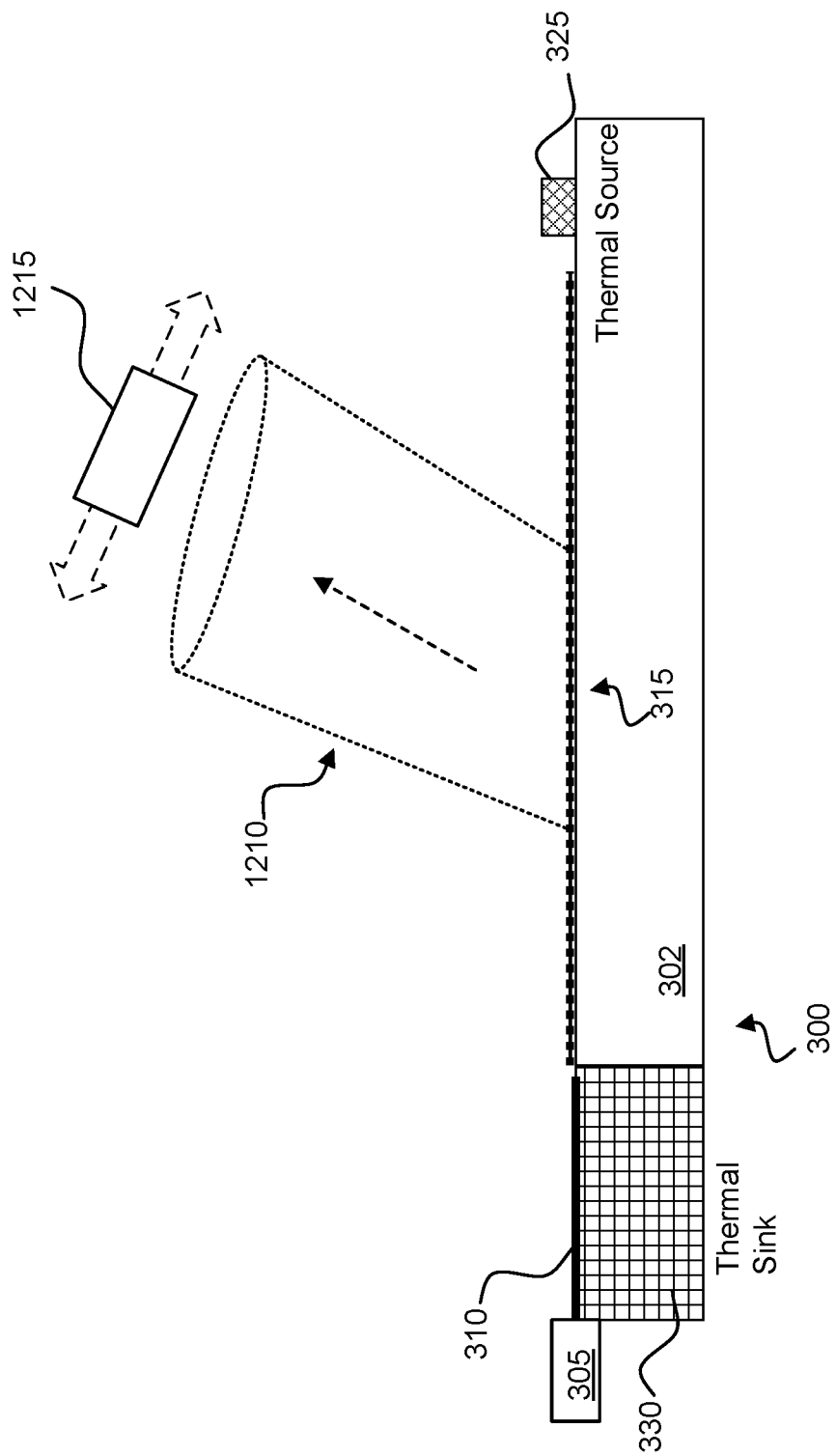
FIG. 12B is a side view of an embodiment of a system for characterizing a photonic circuit.

FIG. 12B is a side view illustrating an example of the beam profiler 1225 used to characterize the photonic integrated circuit 300 of FIG. 3B. In the embodiment of FIG. 12B, the power level of power supplied to the thermal source may be adjusted. Adjusting the power level changes the thermal profile in the photonic integrated circuit 300, and as described above creates a thermal refractive index profile. The effect of the thermal refractive index profile will be to change the angle of divergence of the emitted light beam 1220. By iteratively adjusting the power level of power supplied to the thermal source 325 and measuring a resulting optical intensity profile of the emitted light beam 1220, the photonic integrated circuit 300 may be calibrated to identify a pre-determined power level that corresponds to a thermal refractive index profile that counteracts the inadvertent manufactured refractive index profile of the photonic integrated circuit 300. In some embodiments, the power level may be fixed at the pre-determined power level. In some embodiments, the measured optical intensity profile may be compared with an expected optical intensity profile to identify the pre-determined power level.

Figure 13A:
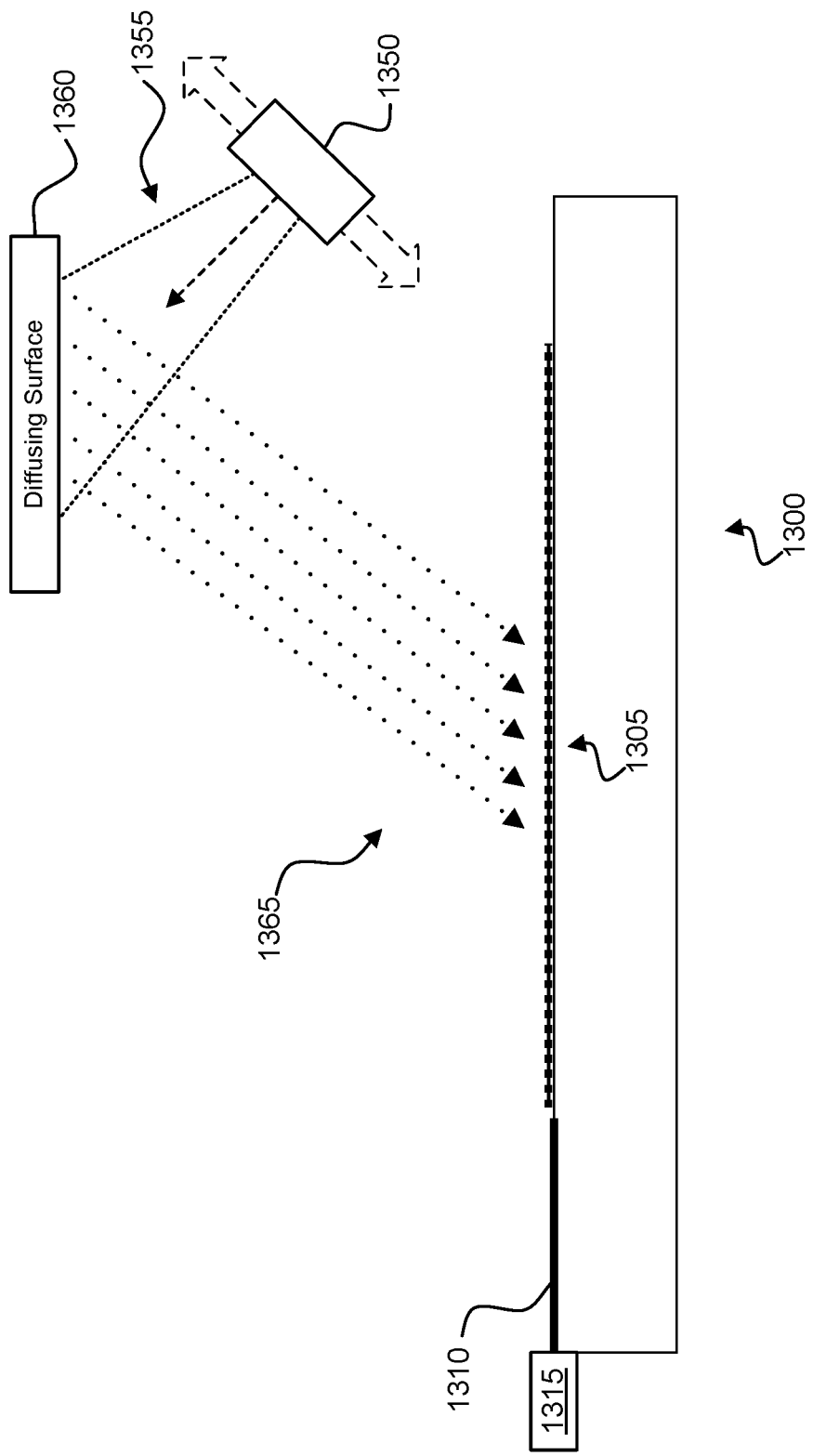
FIG. 13A is a side view of an embodiment of a system for characterizing a photonic integrated circuit.

FIG. 13A is a sideview of an embodiment of a system for characterizing a photonic integrated circuit 1300, such as a phased array, by a calibration laser 1350 that, in the embodiment of FIG. 13A, emits an emitted calibration light beam 1355 toward a diffusing surface 1360. The calibration light beam 1355 may be pulsed or continuous, depending upon the implementation. The diffusing surface 1360 redirecting the calibration light beam 1355 as a diffuse light beam 1365 that is received by the photonic integrated circuit 1300. In some embodiments, the calibration laser 1350 may direct the calibration light beam 1355 directly on the photonic integrated circuit 1300 without the use of an intermediate diffusing surface 1360. The orientation of the calibration laser 1350 and/or diffusing surface 1360 may provide for a directly incident light beam on the photonic integrated circuit 1300, or may provide for a light beam that strikes the photonic integrated circuit 1300 at an angle to a planar receiving surface of the photonic integrated circuit 1300 as illustrated in FIG. 13A.

The phased array 1305 is coupled to a beam combiner 1310 that combines the light received by the at least one series of antennas 1305, and directs the combined light to other components of the photonic integrated circuit 1300 such as the photodetector 1315 illustrated in FIG. 13A. FIG. 13A is not to scale, and accordingly the relative orientation and relative scale of the components are illustrative only.

The relative positions of the calibration laser 1350, the diffusing surface 1360, and the at least one series of antennas 1305 may be fixed, or may be movable. In the embodiment of FIG. 13A, the calibration laser 1350 is operative to mechanically scan in one dimension to affect the distribution of the diffused light beam 1365 across the at least one series of antennas 1365.

During a calibration operation the calibration laser 1350 may emit a calibration light beam 1355 of fixed, or varying, intensity. The calibration comprises measuring the signal from the photodetector 1315.

In some embodiments, the beam splitter 1310 may be an active beam splitter, as described above with respect to beam splitter 310, and may be adjustable by means of an electrical driver. In such an embodiment, the beam splitter 1310 may be calibrated, by means of repeatedly measuring the signal from the photodetector 1315, and adjusting the beam splitter 1310 to produce a desired signal level.

Figure 13B:
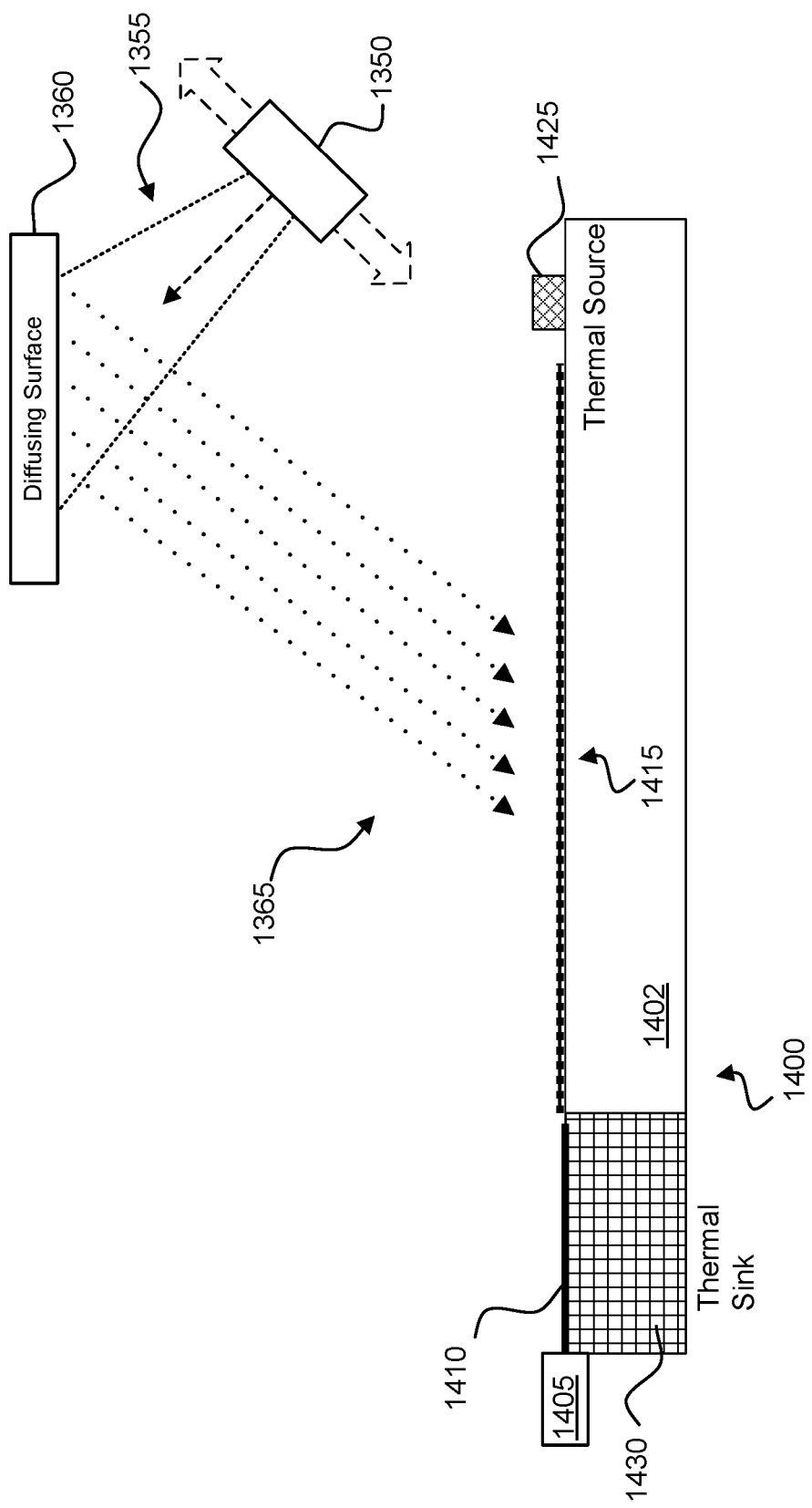
FIG. 13B is a side view of an embodiment of a system for characterizing a photonic circuit.

FIG. 13B is a side view illustrating an example of the calibration laser 1350 used to calibrate a photonic integrated circuit 1400. The photonic integrated circuit 1400 may include a substrate 1402 supporting at least one series of receiving antennas 1415 for capturing light incident on the receiving top surface of the photonic integrated circuit 1400. A beam combiner 1410 gathers the light captured by the at least one series of receiving antennas 1415 and directs the combined light to a photodetector 1405 coupled to the beam combiner 1410. The photonic integrated circuit further includes a thermal source 1425 located at a thermal source end of the at least one series of antennas 1415 and a thermal sink 1430 spaced apart from the thermal source 1425 at an opposed thermal sink end of the at least one series of antennas 1415. In the embodiment of FIG. 13B the thermal sink 1430 is located adjacent to the beam combiner 1410.

During calibration operation, the calibration laser 1350 may be activated and a measurement of the light intensity falling on the at least one series of antennas 1415 may be made by the photodetector 1405. The calibration light beam 1255, in this embodiment in the form of the diffused light beam 1265, may be scanned through a range of angles of incidence relative to the planar receiving surface of the photonic integrated circuit 1400. For a given setting of the photonic integrated circuit 1400, the at least one series of antennas 1415 are intended to be directionally more receptive to receiving light. Accordingly, by directing the calibration light beam 1255 at different angles of incidence, each angle of incidence will have a corresponding expected receptivity (i.e. sensitivity) to the incident light beam. Manufacturing variances in the photonic integrated circuit 1400 may increase the tolerance for receiving light at specific angles of incidence, i.e. reduce the directional sensitivity of the at least one series of antennas 1415.

A power level of the thermal source 1425 may be adjusted to correct for manufacturing variations in the index of refraction of the at least one series of antennas 1415. In particular, the power level of the thermal source 1425 may be adjusted to tighten an active receiving angle of the photonic integrated circuit 1400, and accordingly provide better discrimination between light falling on the at least one series of antennas 1415 at different angles of incidence. During calibration, the calibration light beam 1255 may be scanned through a range of angles of incidence. For a given setting the at least one series of antennas 1415 has an expected sensitivity for each angle of incidence. If the measured optical intensity differs from an expected optical intensity for that angle of incidence, then the at least one series of antennas 1415 is not sufficiently discriminating between angles of incidence. For example, if that angle of incidence is in the wings of the expected optical intensity distribution, and the measured optical intensity is higher than an expected optical intensity for that angle of incidence, then the beam divergence is larger than expected. The power supplied to the thermal source may be adjusted to correct for the manufactured refractive index profile of the at least one series of antennas 1415, tightening their sensitivity to the intended angle of incidence, and reducing their sensitivity to other angles of incidence.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A photonic integrated circuit comprising:
    a substrate;
    at least one series of antennas extending across a coupling surface of the substrate;
    a thermal source in thermal contact with the substrate at a thermal source end of the at least one series of antennas; and,
    a thermal sink in thermal contact with the substrate at an opposed thermal sink end of the at least one series of antennas;
    wherein
    the at least one series of antennas comprises a plurality of parallel waveguides, with each waveguide comprising a series of antennas; and
    activating the thermal source imparts a thermal refractive index profile in the direction of the at least one series of antennas between the thermal source and the thermal sink.

2. The photonic integrated circuit of claim 1, wherein the plurality of parallel waveguides comprise an optical phased array.

3. The photonic integrated circuit of claim 1, further comprising:
    an active component, for controlling the relative optical phase of light directed into the at least one series of antennas.

4. The photonic integrated circuit of claim 3, wherein the active component is located on the substrate and is in thermal contact with the thermal sink.

5. The photonic integrated circuit of claim 1, wherein the at least one series of antennas is structured to impart a structured refractive index profile that changes between the thermal source end and the opposed thermal sink end.

6. The photonic integrated circuit of claim 5, wherein the structured refractive index profile comprises a structured refractive index gradient between the thermal source end and the thermal sink end, wherein the structured refractive index gradient is of opposite sign to the thermal refractive index profile imparted by the thermal source when activated.

7. The photonic integrated circuit of claim 5, wherein the at least one series of antennas comprises a plurality of parallel waveguides, with each waveguide having a decreasing cross-section from the opposed thermal sink end to the thermal source end to create a decreasing refractive index profile from the opposed thermal sink end to the thermal source end.

8. The photonic integrated circuit of claim 5, wherein the at least one series of antennas comprises a plurality of parallel waveguides with each waveguide having a mark-to-space ratio which varies between the thermal source end and the opposed thermal sink end to impart the structured refractive index profile.

9. The photonic integrated circuit of claim 5, wherein the at least one series of antennas comprises a plurality of parallel waveguides, with each waveguide having a pitch which varies between the thermal source end and the opposed thermal sink end to impart the structured refractive index profile.

10. The photonic integrated circuit of claim 1, wherein the at least one series of antennas is structured to provide emission angle variation or reception angle variation along the length of the at least one series of antennas, the variation in emission angle or reception angle of opposite sign from thermal emission angle or reception angle variation caused by the thermal refractive index profile.

11. The photonic integrated circuit of claim 1, wherein the thermal source is located below the coupling surface of the substrate.

12. The photonic integrated circuit of claim 1, further comprising:
   an insulating layer under the at least one series of antennas and between the thermal sink and the thermal source.

13. The photonic integrated circuit of claim 1, wherein the thermal source comprises a heater.

14. The photonic integrated circuit of claim 1, wherein the plurality of parallel waveguides are arranged in parallel and located in cooperating proximity with one another to provide an optical phase array.

15. A photonic integrated circuit comprising:
   a substrate;
   at least one series of antennas extending across a coupling surface of the substrate;
   a thermal source in thermal contact with the substrate at a thermal source end of the at least one series of antennas; and,
   a thermal sink in thermal contact with the substrate at an opposed thermal sink end of the at least one series of antennas;
   wherein activating the thermal source imparts a thermal refractive index profile in the direction of the at least one series of antennas between the thermal source and the thermal sink:
   and further comprising:
   at least one other thermal source between the thermal source end and the opposed thermal sink end.

16. The photonic integrated circuit of claim 15, wherein the at least one other thermal source extends along one side of the at least one series of antennas.

17. The photonic integrated circuit of claim 15, wherein the at least one other thermal source extends across the at least one series of antennas.

* * * * *